United States Patent
Pelletier et al.

(10) Patent No.: US 7,924,731 B2
(45) Date of Patent: Apr. 12, 2011

(54) METHOD AND APPARATUS FOR HANDLING OUT-OF-SEQUENCE PACKETS IN HEADER DECOMPRESSION

(75) Inventors: Ghylain Pelletier, Luleå (SE); Krister Svanbro, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1234 days.

(21) Appl. No.: 10/987,218

(22) Filed: Nov. 15, 2004

(65) Prior Publication Data

US 2006/0187846 A1 Aug. 24, 2006

(51) Int. Cl.
H04L 1/00 (2006.01)
(52) U.S. Cl. .................. 370/252; 370/392; 370/474
(58) Field of Classification Search .................. None
See application file for complete search history.

(56) References Cited

U.S. PATENT DOCUMENTS

| | | | | |
|---|---|---|---|---|
| 5,293,379 | A * | 3/1994 | Carr | 370/474 |
| 6,879,266 | B1 * | 4/2005 | Dye et al. | 341/51 |
| 6,882,637 | B1 * | 4/2005 | Le et al. | 370/349 |
| 7,000,166 | B2 * | 2/2006 | Hata et al. | 714/746 |
| 7,129,860 | B2 * | 10/2006 | Alvarez et al. | 341/51 |
| 7,197,687 | B2 * | 3/2007 | Imura et al. | 714/776 |
| 7,266,118 | B2 * | 9/2007 | Ido et al. | 370/389 |
| 7,290,063 | B2 * | 10/2007 | Kalliokulju et al. | 709/247 |
| 2002/0038385 | A1 | 3/2002 | Kalliokulju | |
| 2002/0091860 | A1 | 7/2002 | Kalliokulju et al. | |
| 2002/0093938 | A1 | 7/2002 | Tourunen | |
| 2002/0097723 | A1 | 7/2002 | Tourunen et al. | |
| 2003/0007512 | A1 | 1/2003 | Tourunen et al. | |
| 2003/0009663 | A1 | 1/2003 | Pelletier et al. | |
| 2004/0037359 | A1 * | 2/2004 | Farineau et al. | 375/240.16 |
| 2004/0185860 | A1 | 9/2004 | Marjelund et al. | |

(Continued)

FOREIGN PATENT DOCUMENTS

WO WO 01/28180 4/2001

(Continued)

OTHER PUBLICATIONS

Intt'l. Search Report and Written Opinion mailed Mar. 15, 2006 in PCT application No. PCT/SE2005/001624.

(Continued)

Primary Examiner — Seema S Rao
Assistant Examiner — Rhonda Murphy
(74) Attorney, Agent, or Firm — Nixon & Vanderhye, P.C.

(57) ABSTRACT

Header compression repair techniques are accomplished, in various aspects, modes, embodiments, and implementations, by a remote terminal (40), by a header decompressor (46) for use at a remote terminal (40), and by methods of operating the remote terminal and/or decompressor, and (optionally) in some aspects, modes, embodiments, and implementations by taking into consideration aspects of structure and operation of a header compressor (25) as well. The remote unit (40) comprises a transceiver (42) or the like which receives, over a link (36) such as an air interface (38), packets including packets having headers which have been compressed and packets which are potentially out-of-order. The header decompressor (46), upon detection of non-receipt of packets anticipated in a flow (34) of packets over the link, stores, with respect to each non-receipt, a snapshot of header decompression context information existing at the non-receipt. Then, when the header decompressor detects header decompression failure for a subsequently received packet, the header decompressor determines (e.g., by executing a repair process) whether header decompression of the subsequently received packet can be achieved using one of plural stored snapshots.

54 Claims, 24 Drawing Sheets

U.S. PATENT DOCUMENTS

| | | |
|---|---|---|
| 2005/0090273 A1 | 4/2005 | Jin et al. |
| 2005/0100056 A1* | 5/2005 | Chuberre et al. ............. 370/532 |
| 2005/0170788 A1* | 8/2005 | Tanaka et al. .................. 455/73 |
| 2006/0056455 A1 | 3/2006 | Ruiz |
| 2006/0104266 A1 | 5/2006 | Pelletier et al. |

FOREIGN PATENT DOCUMENTS

| | | |
|---|---|---|
| WO | 2005/076562 A1 | 8/2005 |

OTHER PUBLICATIONS

U.S. Office Action mailed Feb. 14, 2008 in corresponding U.S. Appl. No. 10/987,219.
"Broadcast/Multicast Services—Stage 1", Revision A, 3GPP2 S.P0030-A Version 0.4.3, Jun. 12, 2003.
"Broadcast-Multicast Service (BCMCS) Framework Draft Document", Version 1.2, 3GPP2 BCMCS ad-hoc group, May 2003.
Jin et al, "Header Compression for BCMCS",QUALCOMM Incorporated, contribution to 3GPP2 BCMCS ad-hoc group, Oct. 2003.
3GPP TS 23.107 V5.10.0 (Sep. 2003), TSG SA; Quality of Service (QoS) concept and architecture.
3GPP TS 43.246 V0.6.0 (Jul. 2003), TSG GERAN; Multimedia Broadcast Multicast Service (MBMS) in the GERAN.
Koren et al, *Enhanced Compressed RTP (CRTP) for Links with High Delay, Packet Loss and Reordering.* IETF RFC 3545, IETF Network Working Group, Jul. 2003.
Jonsson et al, *RObust Header Cmpression (ROHC): A Link-Layer Assisted ROHC Profile for IP/UDP/RTP.* IETF RFC 3242, Apr. 2002.
Liu et al, *Zero-byte Support for Bidirectional Reliable Mode (R-mode) in Extended Link-Layer Assisted RObust Header Compression (ROHC) Profile,* IETF RFC 3408, Dec. 2002.
Pelletier et al, *RObust Header Compression (ROHC): TCP/IP Profile (ROHC-TCP),* Internet Draft (work in progress), <draft-ietf-rohc-tcp-05.txt>, Oct. 2003.
Pelletier, *RObust Header Compression (ROHC): Profiles for UDP-Lite,* Internet Draft (work in progress), <draft-ietf-rohc-udp-lite-02.txt>, Dec. 2003.
Pelletier, *Robust Header Compression (ROHC): Context replication for ROHC profiles,* Internet Draft (work in progress), <draft-ietf-rohc-context-replication-01.txt>, Oct. 2003.
Kikuchi et al, *RTP Payload Format for MPEG-4 Audio/Visual Streams,* Standards Track, RFC 3016, Nov. 2000.
Ash et al, *Requirements for Header Compression Over MPLS,* Network Working Group Internet Draft, Apr. 2004.
Casner et al, *Compressing IP/UDP/RTP Headers for Low-Speed Serial Links.* IETF RFC 2508, IETF Network Working Group, Feb. 1999.
Pelletier, *RObust Header Compression (ROHC): Profiles for UDP-Lite,* Internet Draft, <draft-ietf-udp-lite-04.txt>, Jun. 9, 2004.
Pelletier et al, *RObust Header Compression (ROHC): RDHC Over Chanels that Can Reorder Packets,* Internet Draft, <draft-pelletier-rohc-over-reordering-00.txt>, Jun. 14, 2004.
Bormann, C., *Robust Header Compression (ROHC) over PPP,* IETF RFC 3241, Apr. 2002.
Jonsson eta al, *RObust Header Compression (ROHC): A compression profile for IP,* Internet draft RFC 3843, Jun. 2004.
Degermark et al, *IP Header Compression.* IETF RFC 2507, IETF Network Working Group, Feb. 1999.
Van Jacobson. *Compressing TCP/IP Headers for Low-Speed Serial Links.* IETF RFC 1144, IETF Network Working Group, Feb. 1990.
Bormann, et al. *RObust Header Compression (ROHC): Framework and four profiles: RTP, UDP, ESP and uncompressed.* IETF RFC 3095, Jul. 2001.
Bormann et al, "Robust Header Compression (ROHC); Framework and four Profiles: RTP, UDP, ESP, and uncompressed" (RFC 3095), Jul. 2001, pp. 20-24 and 55-57.
U.S. Office Action mailed Oct. 6, 2008 in co-pending U.S. Appl. No. 10/987,219.
U.S. Office Action mailed Jul. 15, 2009 in related U.S. Appl. No. 10/987,219.
Chinese Office Action and English translation thereof mailed Sep. 25, 2009 in corresponding Chinese application 200580038919.9.
CN Office Action and English translation mailed May 11, 2010 in corresponding CN application 200580038919.9.
Chinese Office Action and English translation thereof mailed Nov. 19, 2010 in Chinese application 200580038919.9.

\* cited by examiner

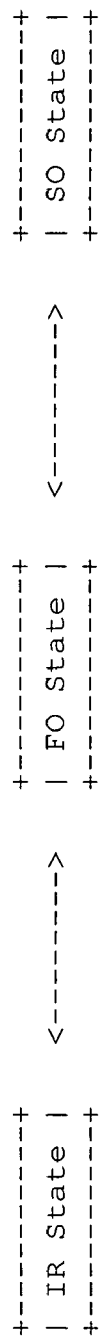
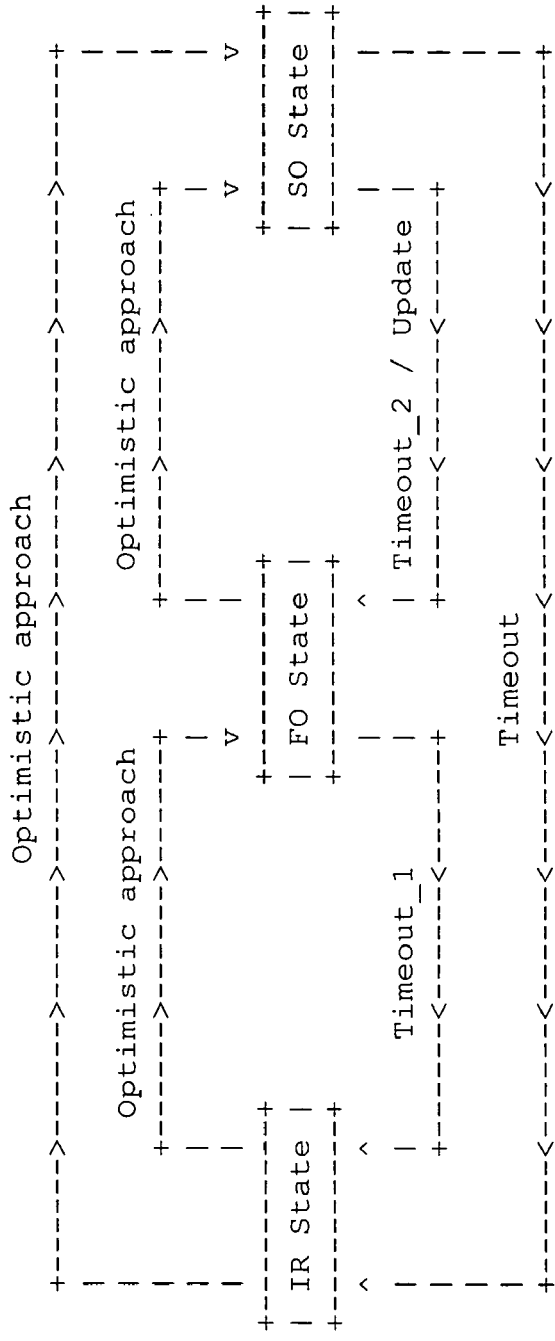

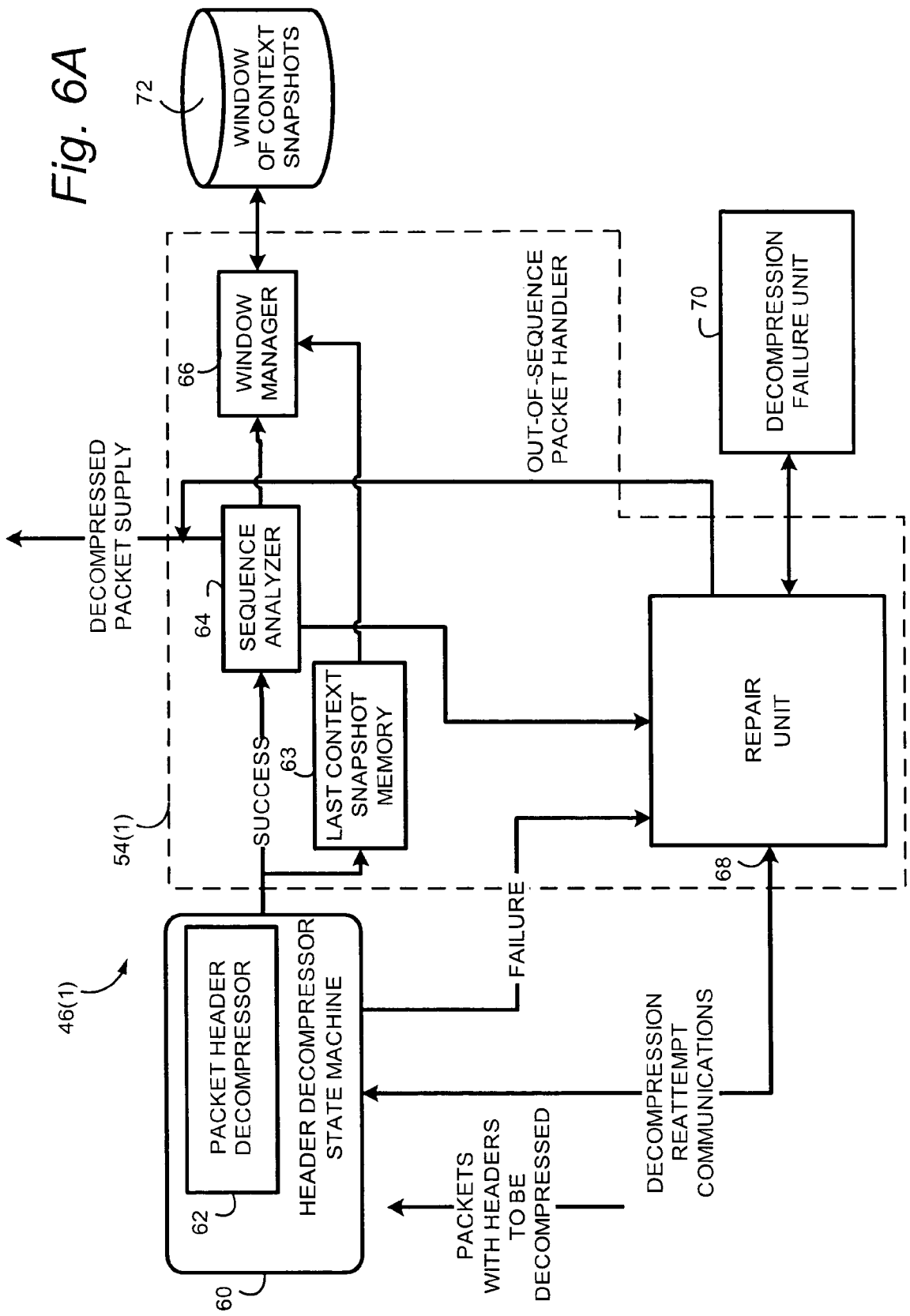

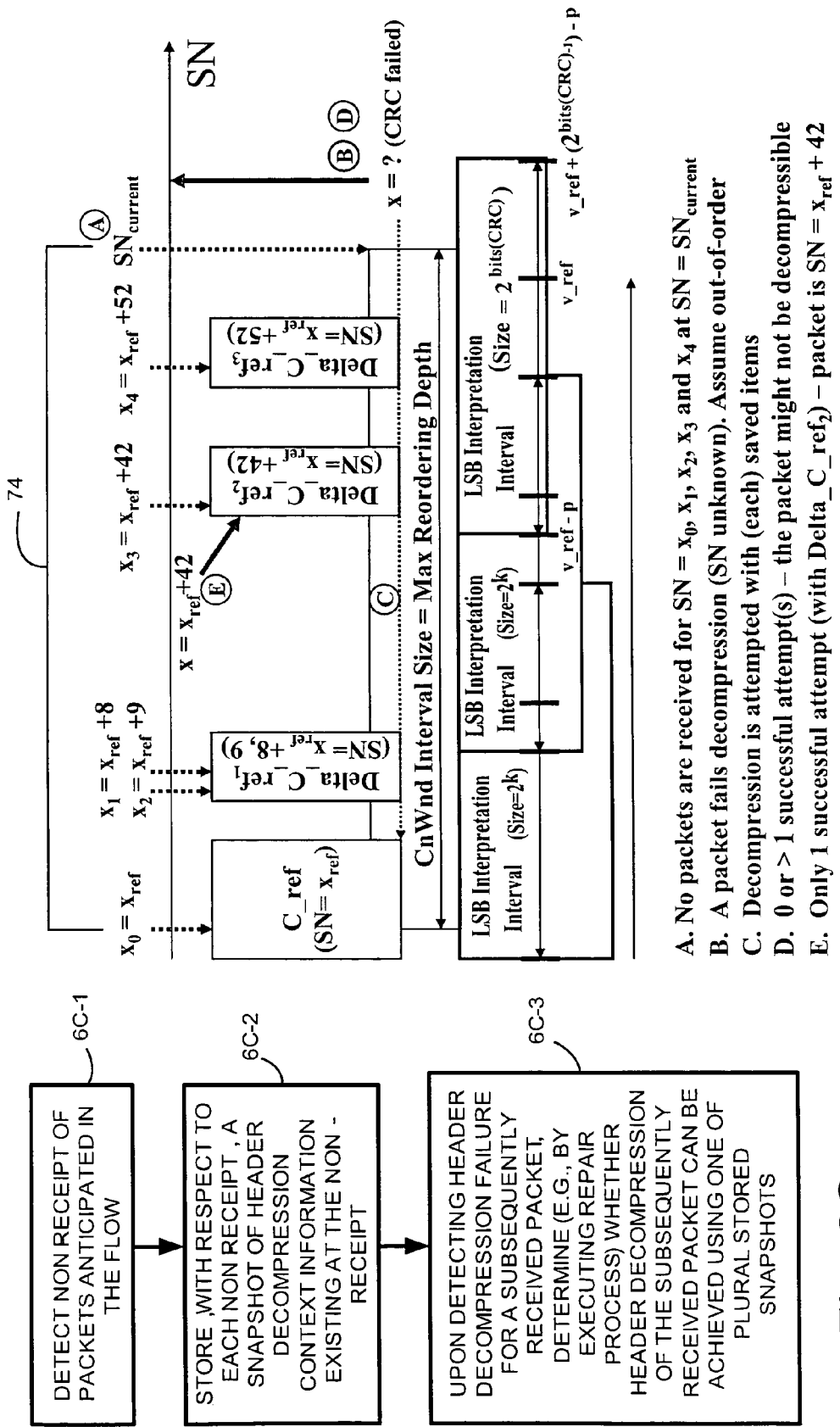

METHOD AND APPARATUS FOR HANDLING OUT-OF-SEQUENCE PACKETS IN HEADER DECOMPRESSION

BACKGROUND

1. Field of the Invention

The present invention pertains generally to telecommunications, and particularly to the compression of headers of packets such as media packets.

2. Related Art and Other Considerations

Due to the tremendous success of the Internet, it has become a challenging task to make use of the Internet Protocol (IP) over all kinds of links. However, because of the fact that the headers of the IP protocols are rather large, it is not always a simple task to make this come true for narrowband links, such as cellular links, for example. As an example, consider ordinary speech data transported by the protocols (IP, UDP, RTP) used for Voice-over-IP (VoIP), where the header may represent about 70% of the packet resulting in a very inefficient usage of the link.

The term "header compression" (HC) encompasses the art of minimizing the necessary bandwidth for information carried in headers on a per-hop basis over point-to-point links. Header compression techniques in general have a more than ten-year-old history within the Internet community. Several commonly used header compression protocols exist, such as the following: (1) Van Jacobson. *Compressing TCP/IP Headers for Low-Speed Serial Links*. IETF RFC 1144, IETF Network Working Group, February 1990; (2) Mikael Degermark, Björn Nordgren, Stephen Pink. *IP Header Compression*, IETF RFC 2507, IETF Network Working Group, February 1999; and (3) Steven Casner, Van Jacobson. *Compressing IP/UDP/RTP Headers for Low-Speed Serial Links*, IETF RFC 2508, IETF Network Working Group, February 1999, all of which are incorporated by reference herein in their entirety.

Header compression takes advantage of the fact that some fields in the headers are not changing within a flow, or change with small and/or predictable values. Header compression schemes make use of these characteristics and send static information only initially, while changing fields are sent with their absolute values or as differences from packet to packet. Completely random information has to be sent without any compression at all.

Header compression is thus an important component to make IP services over wireless, such as voice and video services, economically feasible. Header compression solutions have been developed by the Robust Header Compression (ROHC) Working Group of the Internet Engineering Task Force (IETF) to improve the efficiency of such services.

Robust Header Compression (ROHC), as defined in RFC 3095 (Bormann, C., "RObust Header Compression (ROHC): Framework and four profiles: RTP, UDP, ESP, and uncompressed", RFC 3095, Internet Engineering Task Force, July 2001), is an extensible framework for which profiles for compression of various protocols may be defined. For real-time multimedia services (e.g. voice, video), the application data is transported end-to-end within an IP/UDP/RTP stream. Header compression of IP/UDP/RTP is defined by the ROHC profile 0x0001 (ROHC RTP) and is applicable for Voice-over-IP (VoIP) services among others. The ROHC RTP header compression scheme has been designed to efficiently compress the IP/UDP/RTP headers over an arbitrary link layer.

A number of other ROHC profiles have also been defined for compression. Among these are (1) IP/UDP/RTP headers (described in: Jonsson, L. and G. Pelletier, *RObust Header Compression (ROHC): A Link-Layer Assisted ROHC Profile for IP/UDP/RTP*, IETF RFC 3242, April 2002; and Liu, Z and K. Le, *Zero-byte Support for Bidirectional Reliable Mode (R-mode) in Extended Link-Layer Assisted RObust Header Compression (ROHC) Profile*, IETF RFC 3408, December 2002); (2) IP only headers (described in: Jonsson, L. and G. Pelletier, *RObust Header Compression (ROHC): A compression profile for IP*, IETF RFC 3843, June 2004); (3) IP/TCP headers (described in: Pelletier, G., Jonsson, L., West, M. and R. Price *RObust Header Compression (ROHC): TCP/IP Profile (ROHC-TCP)*, Internet Draft (work in progress), <draft-ietf-rohc-tcp-08.txt>, October 2004); and (4) IP/UDP-Lite/RTP headers (described in: Pelletier, G., *RObust Header Compression (ROHC): Profiles for UDP-Lite*, Internet Draft (work in progress), <draft-ietf-rohc-udp-lite-04.txt>, June 2004). All RFCs cited herein are incorporated by reference herein in their entireties.

Except for negotiation (see also Bormann, C., *Robust Header Compression (ROHC) over PPP*, IETF RFC 3241, April 2002), ROHC profiles only requires framing and error detection to be provided by the link layer, while all other functionality is handled by the ROHC scheme itself.

The ROHC profiles defined in RFC 3095, RFC 3242, RFC 3408, "IP-ONLY" (Jonsson, L. and G. Pelletier, *RObust Header Compression (ROHC): A compression profile for IP*, IETF RFC 3843, June 2004) and "ROHC-UDPLite" (Pelletier, G., *RObust Header Compression (ROHC): Profiles for UDP-Lite*, Internet Draft (work in progress), <draft-ietf-rohc-udp-lite-04.txt>, June 2004) all support three different modes of operation. In short, for a specific context, the mode of operation controls the actions and the logic to perform as well as the packet types to use during different states of the header compression operation. Packet types and formats that are allowed may vary from one mode to the other. The Unidirectional mode (U-mode) is used at the beginning of any ROHC compression before any transition to other modes may occur. The Bidirectional Optimistic mode (O-mode) seeks to maximize the compression efficiency and sparse usage of the feedback channel. The Bidirectional Reliable mode (R-mode) seeks to maximize robustness against loss propagation and context damage propagation.

When in U-mode, packets are sent from compressor to decompressor only. The U-mode is thus usable over links where a return path from decompressor to compressor is either not desired or not available. Periodical refreshes are used in U-mode. The U-mode is particularly applicable to broadcast or multicast channels.

The O-mode is similar to the U-mode with the difference that a feedback channel is used to send error recovery requests and (optionally) acknowledgements of significant context updates from the decompressor to compressor. For most ROHC profiles, the U-mode and the O-mode are often indistinctly referred to using the term U/O-mode, due their rather similar characteristics—such as an identical set of packets formats for both modes.

The R-mode differs significantly from the two other modes, mainly by making a more extensive usage of the feedback channel and a stricter logic for performing context updates. The R-mode also uses a few different packet types only understood and useful in this mode.

Each mode of operation has different properties in terms of compression efficiency, robustness and processing complexity. Mode transitions may only be initiated by the decompressor. ROHC does not specify how and when each mode should be used (other than that ROHC compression must always start in U-mode). Therefore, the logic for mode transitions is an implementation decision and may be based on measurements of the link characteristics, link conditions, implementation optimizations for a specific mode or may be based on other algorithms. In particular, for Broadcast/Multicast type of services, header compression operates in the unidirectional mode (U-Mode) only, as normally for such services a feedback channel from decompressor to compressor is not available or desired.

A header compression scheme (such as a ROHC Profile) can be conceptualized and/or realized as a state machine. A challenging task is to keep the compressor and decompressor states, called contexts, consistent with each other, while keeping the header overhead as low as possible. There is one state machine for the compressor, and one state machine for the decompressor. The compressor state machine directly impacts the level of compression efficiency, as it is an important part of the logic controlling the choice of compressed packet type to be sent. The purpose of the decompressor state machine is mainly to provide the logic for feedback (if applicable) and to identify the packet types for which decompression may be attempted.

A compression context contains and maintains relevant information about past packets, and this information is used to compress and decompress subsequent packets. As explained in the ROHC documentation, the context of the compressor is the state it uses to compress a header. The context of the decompressor is the state it uses to decompress a header. Either of these or the two in combination are usually referred to as "context", when it is clear which is intended. The context contains relevant information from previous headers in the packet stream, such as static fields and possible reference values for compression and decompression. Moreover, additional information describing the packet stream is also part of the context, for example information about how the IP Identifier field changes and the typical inter-packet increase in sequence numbers or timestamps.

For the ROHC profiles defined in RFC 3095, RFC 3242, RFC 3408, "IP-ONLY" (Jonsson, L. and G. Pelletier, *RObust Header Compression (ROHC): A compression profile for IP*, IETF RFC 3843, June 2004) and "ROHC-UDPLite" (Pelletier, G., *RObust Header Compression (ROHC): Profiles for UDP-Lite*, Internet Draft (work in progress), <draft-ietf-rohc-udp-lite-04.txt>, June 2004), FIG. 1 shows the compressor state machine. For ROHC compression, the three compressor states are the Initialization and Refresh (IR), First Order (FO), and Second Order (SO) states. The compressor starts in the lowest compression state (IR) and transits gradually to higher compression states. The compressor will always operate in the highest possible compression state, under the constraint that the compressor is sufficiently confident that the decompressor has the information necessary to decompress a header compressed according to that state. See, e.g., RFC 3095, section 4.3.1 (Carsten Bormann, et al. *RObust Header Compression (ROHC): Framework and four profiles: RTP, UDP, ESP and uncompressed*; IETF RFC 3095, April 2001). In particular while operating in U-Mode, decisions about transitions between the various compression states are normally taken by the compressor on the basis of variations in packet headers and periodic timeouts.

According to RFC 3095 defines the Initialization and Refresh (IR) State, in section 4.3.1, the purpose of the IR state is to initialize the static parts of the context at the decompressor or to recover after failure. In this state, the compressor sends complete header information. This includes all static and nonstatic fields in uncompressed form plus some additional information. The compressor stays in the IR state until it is fairly confident that the decompressor has received the static information correctly.

The IR state is thus the state were the compression level is the lowest. FIG. 2, taken from RFC 3095, section 5.3.1, describes the U-Mode state machine. In the U-mode state machine of FIG. 2, Timeout_1 typically corresponds to a periodic sending of the static (and possibly also dynamic) parameters of the decompressor context, while Timeout_2 typically corresponds to a periodic sending of only the dynamic parameters of the decompressor context.

In addition, the context replication (CR) mechanism for ROHC profiles introduce an additional state, the CR state. See, Pelletier, G., Robust Header Compression (ROHC): Context replication for ROHC profiles, Internet Draft (work in progress), <draft-ietf-rohc-context-replication-01.txt>, October 2003. To date, only the [ROHC-TCP] profile specifies support for context replication, but other profiles may also support it provided their corresponding standard is updated. The CR state may also be used by a profile operating in U-Mode. FIG. 3 shows the logic added to the previous state machine for the CR state. In U-Mode, downward transitions are performed according to the same logic as described above.

FIG. 4, taken from RFC 3095, section 5.3.2, illustrates an example U-Mode decompressor state machine. The state of the decompressor dictates what type of compressed packet may be decompressed. In the No Context (NC) state, only packets initializing the static part may be decompressed (e.g. ROHC IR packets). In the Static Context (SC) state, only packets containing sufficient information on the dynamic parameters (e.g. ROHC IR-DYN or UOR-2 packets) may be decompressed. In the Full Context (FC) state, any packet may be decompressed. Thus, depending on the condition of the channel and on the success rate of the decompression, the decompressor state machine will transit between the different states and will have to wait for the reception of a suitable packet for attempting decompression.

In unidirectional operation, there is no feedback sent back to the compressor. Therefore, in unidirection operation, the decompressor may (in the worst cases) have up to Timeout_1 of waiting time without possibility to start decompression of the received packets, and up to Timeout_2 before it can re-start compression after severe context damage to the dynamic information.

To date, header compression algorithms have been designed under the assumption that packets (whose headers are compressed) are delivered essentially in order, and thus that the packets do not require substantial re-ordering upon receipt. In accordance with such assumption, most conventional header compression algorithms operate on the premise that reordering of a header-compressed packet between a compressor and a decompressor is not possible. See, e.g., Van Jacobson, *Compressing TCP/IP Headers for Low-Speed Serial Links*, IETF RFC 1144, IETF Network Working Group, February 1990; Mikael Degermark, Björn Nordgren, Stephen Pink, *IP Header Compression*, IETF RFC 2507, IETF Network Working Group, February 1999; Steven Casner, Van Jacobson, *Compressing IP/UDP/RTP Headers for Low-Speed Serial Links*, IETF RFC 2508, IETF Network Working Group, February 1999; and Carsten Bormann, et al. *RObust Header Compression (ROHC): Framework and four profiles: RTP, UDP, ESP and uncompressed*, IETF RFC 3095, April 2001, all of which are incorporated herein by reference.

A few header compression algorithms allow or accommodate only slight out-of-sequence delivery of packets, and thus only slight reordering of packets upon reception (with a depth of very few packets). See, e.g., Koren, T., Casner, S., Geevarghese, J., Thompson B. and P. Ruddy, *Enhanced Compressed RTP (CRTP) for Links with High Delay, Packet Loss and Reordering*, IETF RFC 3545, IETF Network Working Group, July 2003; and Pelletier, G., Jonsson, L. and Sandlund, K., *Robust Header Compression (ROHC) over Channels that can reorder packets*, Internet Draft (work in progress), <draft-pelletier-rohc-over-reordering-00.txt>, June 2004, incorporated herein by reference.

The design of compression algorithms has primarily focused on improving the tolerance against packet losses, driven by the properties of wireless cellular links. Encoding of sequential information has been improved from cumulative delta encoding to more robust Window Least Significant Bit (W-LSB) encoding. Cumulative delta coding is described, e.g., in Van Jacobson, *Compressing TCP/IP Headers for Low-Speed Serial Links*, IETF RFC 1144, IETF Network Working Group, February 1990; Mikael Degermark, Björn Nordgren, Stephen Pink. *IP Header Compression*, IETF RFC 2507, IETF Network Working Group, February 1999; and, Steven Casner, Van Jacobson. *Compressing IP/UDP/RTP Headers for Low-Speed Serial Links*, IETF RFC 2508, IETF Network Working Group, February 1999. Window Least Significant Bit (W-LSB) encoding is described in Carsten Bormann, et al. *RObust Header Compression (ROHC): Framework and four profiles: RTP, UDP, ESP and uncompressed*, IETF RFC 3095, April 2001. Other approaches have also been used, such as reducing the compression ratio for sequential information (Koren, T., Casner, S., Geevarghese, J., Thompson B. and P. Ruddy, *Enhanced Compressed RTP (CRTP) for Links with High Delay, Packet Loss and Reordering*, IETF RFC 3545, IETF Network Working Group, July 2003) or tweaking some parameters of existing encoding methods (Pelletier, G., Jonsson, L. and Sandlund, K., *Robust Header Compression (ROHC) over Channels that can reorder packets*, Internet Draft (work in progress), <draft-pelletier-rohc-over-reordering-00.txt>, June 2004).

Consistently with the foregoing observations, the IETF ROHC working group (WG) has designed header compression algorithms (profiles) with the assumption that the channel between the compressor and the decompressor will not reorder the header-compressed packets. As such, the channel is required to maintain packet ordering for each compressed flow. Encoding methods have been defined with this assumption in order to aggressively compress headers and achieve a high compression ratio. For some profiles, modifications can be made to the logic and/or to some encoding methods (e.g. LSB) in order to handle a very small (less than 5 packets) amount of reordering (Pelletier, G., Jonsson, L. and Sandlund, K., *Robust Header Compression (ROHC) over Channels that can reorder packets*, Internet Draft (work in progress), <draft-pelletier-rohc-over-reordering-00.txt>, June 2004)). However, changes to fields that are not encoded using sequential information (e.g. semi-static fields) limit the possibility to decompress a reordered packet and/or to prevent severe context damage in the presence of moderate (tens of packets) or high (hundreds of packets) reordering.

With the upcoming development of wireless links with higher bit rates and lower latencies (still relatively high latency with respect to the bit rate), the in-order delivery assumption will likely no longer be operative. There will be a need for header compression/decompression algorithms which not only are robust not against packet losses, but also against out-of-order delivery and thus reordering of packets.

What is needed, therefore, and an object of the present invention, are method and apparatus capable of header decompression even for out-of-sequence packets.

SUMMARY

Header compression repair techniques are accomplished, in various aspects, modes, embodiments, and implementations, by a remote terminal, by a header decompressor for use at a remote terminal, and by methods of operating the remote terminal and/or decompressor, and (optionally) in some aspects, modes, embodiments, and implementations by taking into consideration aspects of structure and operation of a header compressor as well.

The header decompressor is adapted for use with a remote unit such as a mobile station or user equipment unit. Typically the remote unit additionally comprises a transceiver or the like which receives, over a link such as an air interface, packets including packets having headers which have been compressed and packets which are potentially out-of-order. In accordance with one independent and distinct aspect of its configuration and operation, the header decompressor, upon detection of non-receipt of packets anticipated in a flow of packets over the link, stores, with respect to each non-receipt, a snapshot of header decompression context information existing at the non-receipt. Then, when the header decompressor detects header decompression failure for a subsequently received packet, the header decompressor determines (e.g., by executing a repair process) whether header decompression of the subsequently received packet can be achieved using one of plural stored snapshots. In endeavoring for such achievement, preferably the decompressor (e.g., using the repair process) reattempts decompression of the subsequently received packet, and in such reattempt uses each of the plural stored snapshots. The header decompressor (e.g., using the repair process) more definitively determines that reattempt of the header decompression for the subsequently received packet succeeds if the header decompression of the subsequently received packet was achieved using one and only one of the plural stored snapshots. If more than one of the plural snapshots achieve successful header decompression for the packet, a choice of which of the plural snapshots to actually use for the packet can be based on other techniques, such as (for example) transport protocol checks or the like, such as transport protocol checksum or CRC, for example.

As one example implementation of the first aspect of configuration and operation, for each packet or group of consecutive packets missing in a sequence of the flow, the header decompressor stores a corresponding snapshot in a set of snapshots in a sliding window memory. In differing modes, the header decompressor may use either all snapshots in the set, or a subset of the snapshots in the set, for reattempting decompression of the subsequently received packet. In a mode in which a subset of snapshots are utilized, constitution of the subset may be based on most likely snapshots to facilitate successful decompression, e.g., snapshots determined by packet sequence number (e.g., least significant bits of the sequence number) which are carried in the packet header.

In accordance with a second independent and distinct aspect of its configuration and operation, the header decompressor also ascertains whether header decompression fails for a predetermined number of packets received after the non-receipt of the packets anticipated in the flow. Such header decompression failure could possibly result from the fact that one or more of the non-received packets may have carried significant context update information, without which the header decompressor incurs "context damage". If so, the header decompressor (e.g., using an auxiliary repair process) stores the packets received after the non-receipt and which failed the header decompression (e.g., the "buffered packets") in hopes that, should it be able somehow to recover the lost context update information, it can use such lost context update information to perform subsequent repair of the buffered packets. Thus, in accordance with the second aspect, if (e.g., by execution of the repair process) the header decompressor achieves decompression of the subsequently received packet using one of the plural stored snapshots, the snapshot of the header decompression context information which achieved header decompression is updated and used (e.g., by the auxiliary repair process) for reattempting header decompression of the stored (buffered) packets.

In the second aspect, achieving recovery of the decompression of the subsequently received packet using one of the plural stored snapshots is possible in two example situations. In a first such situation, the context update information necessary for decompressing the buffered packets was an out-of-order packet (treated as the subsequently received packet) which was delayed and received by the header decompressor only after the context damage was detected. In a second such situation, the context update information necessary for decompressing the buffered packets is obtained by a retransmission in another packet (treated as the subsequently received packet), as discussed below in conjunction with a third aspect.

In accordance with the third independent and distinct aspect of its configuration and operation, upon its failure (e.g., using the repair process) to decompress a packet header, the header decompressor generates a notification of the non-receipt of packets anticipated in the flow. Preferably, the notification of the non-receipt includes packet resend information to enable resending (e.g., from a header compressor across the link) of a packet with appropriate updating header decompression context information to rejuvenate the header decompressor's efforts (e.g., using the repair process) to perform successful header decompression. For example, the notification of the non-receipt includes a sequence number of a last successfully decompressed packet as the packet resend information.

As an example implementation, the header decompressor stores snapshots in a sliding window memory. The size of the sliding window memory is preferably determined by a product of bandwidth and delay of the link. The header decompressor updates contents of the sliding window memory by ensuring that an oldest snapshot in the sliding window memory corresponds to a maximum reordering depth that the sliding window memory can handle.

In accordance with a fourth independent and distinct aspect of its configuration and operation, the header decompressor (e.g., by executing a window allocation process) temporarily allocates reusable memory for plural stored snapshots in accordance with a one or more window parameters received on the link. The parameter(s) can indicate one or more (and preferably all) of the following: a size of the reusable memory in which the plural stored snapshots are stored; when to allocate the reusable memory for storing the plural stored snapshots; when to de-allocate the reusable memory for storing the plural stored snapshots.

In accordance with this fourth aspect, the header decompressor imposes additional memory and processing requirements for the sliding window memory only selectively, e.g., at times indicated by the window parameters. Advantageously, using this fourth aspect, the memory locations allocated for the sliding window memory can be temporarily allocated and elsewise utilized when the repair process is not invoked or anticipated. Likely times for invoking or anticipating the repair process for the header decompressor, and thus allocation of the sliding window memory, include handoffs and handovers of various types, or any other time or period when packets may be prone to be out of order or prone to loss. Such times can be determined by measurement or predicted by historical (likelihood) information.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 1 is a diagrammatic view of an example compressor state machine.

FIG. 2 is a diagrammatic view of an example U-Mode state machine.

FIG. 6A is a schematic view showing basic, example functional entities of a header decompressor according to a first example aspect.

FIG. 6C is a diagrammatic view showing basic, example operations performed by the header decompressor of FIG. 6A.

FIG. 7 is a diagrammatic view showing an example sliding window maintained by a window manager.

DETAILED DESCRIPTION OF THE DRAWINGS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well-known devices, circuits, and methods are omitted so as not to obscure the description of the present invention with unnecessary detail.

Figure 3:
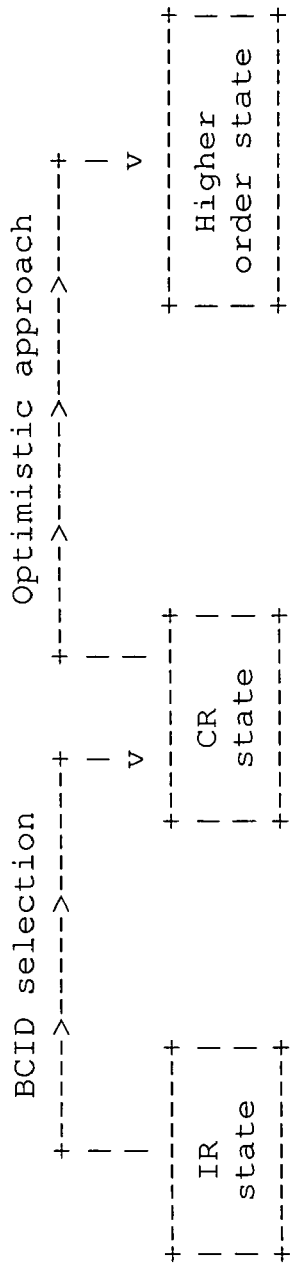
FIG. 3 is a diagrammatic view showing logic added to a state machine for the CR state.
Figure 4:
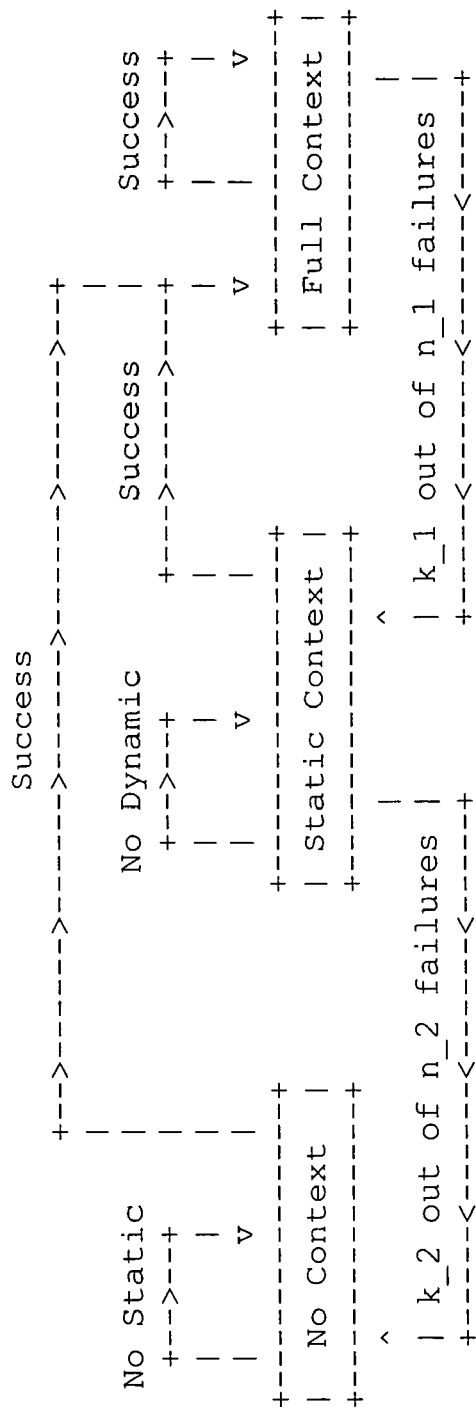
FIG. 4 is a diagrammatic view showing an example U-Mode decompressor state machine.
Figure 5:
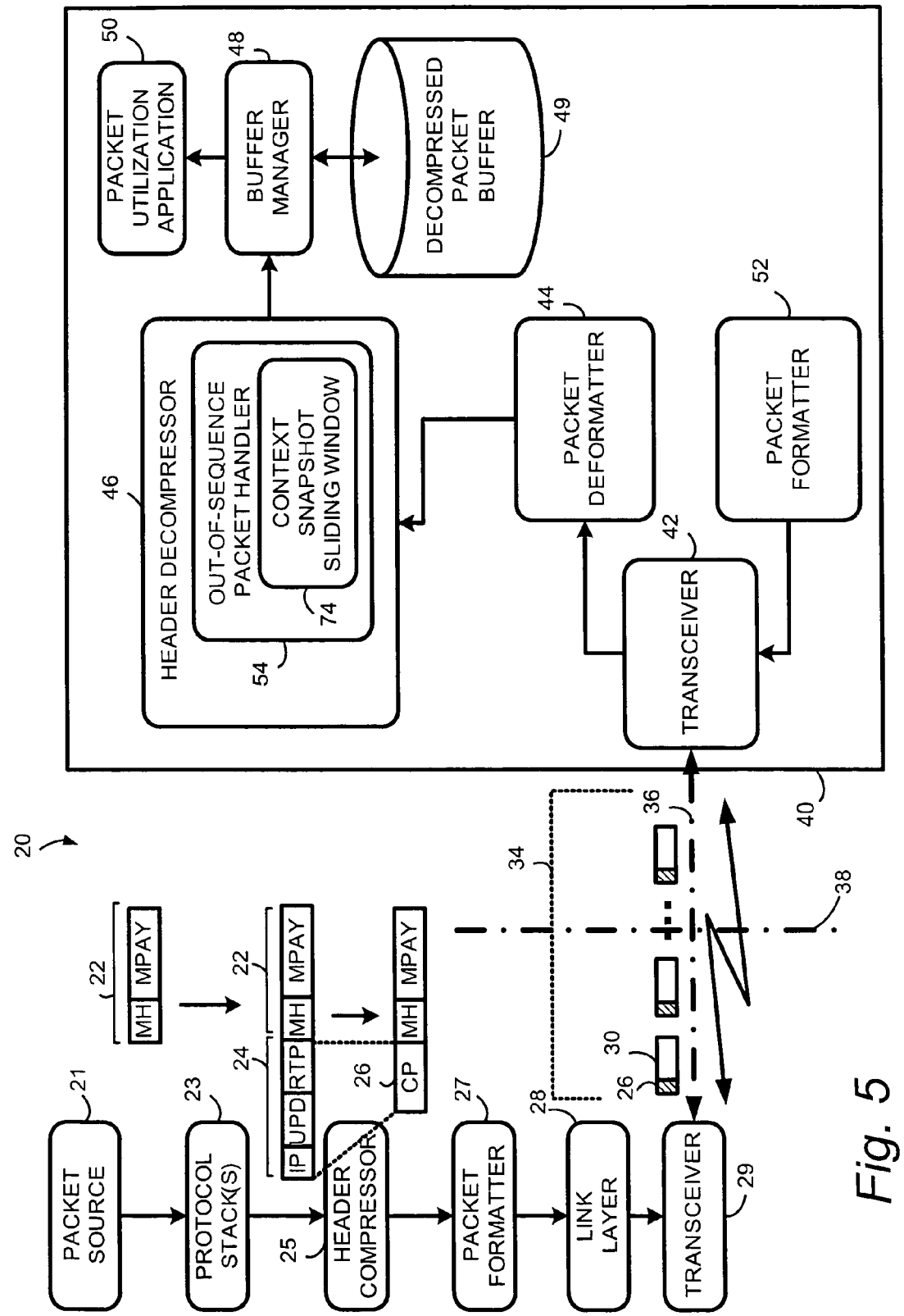
FIG. 5 is a diagrammatic view showing a generic telecommunications system which serves as an example context for illustrating techniques of header decompression repair.

FIG. 5 shows an example telecommunications network 20 wherein a stream of packets are supplied by a packet source 21. FIG. 5 shows, for example, a media packet 22 having a media payload (MPAY) and header (MH) being applied to a protocol stack 23. The particular protocols comprising the protocol stack can vary, and typically comprise an application protocol, under a transport protocol, under an Internet Protocol. In the particularly illustrated example, the protocol stacks 23 serve to affix protocol headers 24 (e.g., IP, UDP, and RTP) to the media packet 22. The media packet 22 with its appended protocol headers 24 is applied to a packet header compressor 25. The packet compressor 25 compresses the protocol headers 24, resulted in a compressed header 26 for the packet. The header compressor 25 performs header compression according to any of many suitable header compression algorithms, either conventional (such as ROHC or SigComp, for example) or otherwise. After the header of the packet is compressed by header compressor 25, a packet formatter 27 incorporates the compressed header into a packet which is applied to a transceiver 29. The transceiver 29 serves to transmit the packet, such as packet 30 with its compressed header 26, in a flow 34 of packets over link 36 across an interface 38 to a remote unit 40. The flow 34 of packets, likely most with compressed headers, need not be continuous, but can instead be sporadic, depending on the type of packet service involved and the nature of the material included in the packet service (e.g., media type).

The packet stream issuing from packet source 21 of FIG. 5 can be realized in various ways. For examples, the packet stream can either (1) be pre-recorded and sent by a server (in this case the media in the media packet 22 is already encoded); (2) come from a transcoder (which adapts the original media from a source to another media encoding potentially more suitable and/or supported by terminals); or (3) come from a source that performs real-time encoding of live media. Thus, the header compressor can receive an input media packet from any of several types of media sources somewhere within the IP network. The packet source 21 can be any suitable source, such as a media server, for example, and may be located in a node or network common or remote from header compressor 25.

The aforementioned telecommunications elements, illustrated to the left of interface 38 in FIG. 5, are illustrated only as certain representative elements germane to the present discussion, and understandably do not constitute the whole of the telecommunications network 20, as many other unillustrated elements are also present. Moreover, the set of illustrated elements may be distributed throughout one or more nodes or networks (e.g., core networks or radio access networks), and in some instances an individual element itself may be distributed to plural platforms and/or plural nodes. Thus, for sake of simplification the illustrated elements are shown as being connected directly and successively together in the manner of FIG. 5.

While remote unit 40 has numerous elements, certain basic, representative elements suitable for an understanding of the header decompression performed by remote unit 40 are shown in FIG. 5. Among these elements are transceiver 42, which applies packets received on link 36 to a packet deformatter 44. The packet deformatter 44 serves essentially to extract a compressed header from the received packet. After the compressed header is extracted, it is sent to header decompressor 46 for decompression. After the header of a packet has been decompressed by header decompressor 46, the packet including its decompressed header is stored by buffer manager 48 in decompressed packet buffer 49. The buffer manager 48 also retrieves decompressed packets from decompressed packet buffer 49 as needed for the packet utilization application 50, e.g., the particular application which is involved in receiving a media stream or the like. In addition, remote unit 40 includes a packet formatter 52 for preparing packets to be sent back across link 36 (as well as various unillustrated elements upstream from packet formatter 52).

The header compressor 25 serves to compress headers of packets (such as media packets) which have been supplied by packet source 21 and possibly additionally encoded. In conjunction with its header compression, header compressor 25 sends context information to a decompressor for use by the decompressor in decompressing compressed headers of the media packets. As used herein, "context information" encompasses one or both of context initialization information and context refresh information. The context information can be included in the flow of packets to remote unit 40 based on a periodic interval, as it is normally the case (as in, e.g., RFC 3095 (Bormann, C., "RObust Header Compression (ROHC): Framework and four profiles: RTP, UDP, ESP, and uncompressed", RFC 3095, Internet Engineering Task Force, July 2001), or alternatively can be included in accordance with a media characteristic of the media packets as disclosed in U.S. patent application Ser. No. 10/987,219, entitled "method and apparatus for HEADER COMPRESSION WITH transmission of CONTEXT information DEPENDENT UPON MEDIA CHARACTEristic", simultaneously filed herewith and incorporated herein by reference.

The header decompressor 46 is thus adapted for use with a remote unit 40 (which may take the form of, or also be known as, any of numerous devices/appellations such as mobile station, mobile terminal, wireless terminal, or user equipment unit). In the illustrated embodiment of FIG. 5, the header decompressor 46 happens to be situated in a wireless remote unit 40. As such, the remote unit 40 receives radio frequency transmissions over an air or radio interface, depicted by dashed-dotted line 38 in FIG. 5. Use of a wireless remote unit 40 is consistent with, for example, the RFCs cited herein and incorporated by reference. Yet it will be appreciated that the header decompression techniques described herein are not limited to use with any particular type of remote terminal or terminal interface, and that the techniques can instead or additionally be utilized for transmissions that are not wireless, or are by types of radiation or waves other than radio waves. Our-of sequence packet reception may occur in a wire link network or system, for example, when there are different physical paths, and thus different delays, for a same virtual link.

The remote unit 40 receives, over a link 36 such as an air interface, packets including packets having headers which have been compressed. The packets are generally transmitted over the link in a sequential order. However, the remote unit 40 is capable, by virtue of handler 54 included in header decompressor 46, of handling out-of-sequence packets including those which have undergone moderate reordering or even high reordering. As used herein, a packet having undergone "moderate reordering" means that the packet is out of sequence by a number comparable to tens of packets, while a packet having undergone "high reordering" means that the packet is out of sequence by a number comparable to hundreds of packets. Such out-of-sequence handling is illustrated below in several representative, non-limiting and potentially independent aspects.

Reattempted Decompression Using Stored Transitory Context States

FIG. 6A shows example structural and/or functional units of header decompressor 46(1) according to a first aspect. The header decompressor 46(1) includes a decompression state machine 60 which receives, from packet deformatter 44, packets with headers which need to be decompressed. The decompression state machine 60 (in the manner described above and as understood by the person skilled in the art) provides, e.g., the logic for feedback (if applicable) and identifies the packet types for which decompression may be attempted. The decompression state machine 60 includes a packet header decompressor 62 which actually performs, or at least attempts to perform, the decompression of each packet requiring decompression.

The out-of-sequence packet handler 54 of header decompressor 46(1) further includes various other elements or functionalities depicted in FIG. 6A. Such elements or functionalities include last context snapshot memory 63; sequence analyzer 64; window manager 66; and repair unit 68. A decompression failure unit/routine 70 is included in header decompressor 46(1), either separately or as a part of the out-of-sequence packet handler 54. As with other aspects of header decompressor hereinafter described, these elements or functionalities may be implemented, either separately or collectively, using individual hardware circuits, using software functioning in conjunction with one or more suitably programmed digital microprocessors or general purpose computers, using an application specific integrated circuit (ASIC), and/or using one or more digital signal processors (DSPs).

In terms of basic events or steps of operation (as illustrated in FIG. 6C), header decompressor 46(1) first detects non-receipt of packets anticipated in the flow 34 of packets over the link 36 (event 6C-1). In the example implementation of FIG. 6A, the sequence analyzer 64 performs the detection of the non-receipt of packets. Upon detection of non-receipt of packets anticipated in the flow 34, header decompressor 46(1), as event 6C-2 stores, with respect to each non-receipt, a snapshot of header decompression context information existing at the non-receipt. As used herein, a "snapshot" or context item is the state information that is necessary and kept for the decompression of a specific packet, i.e., a packet for sequence number SN=x. The identity and nature of such information is understood with reference to various sections of RFC 3095 (Bormann, C., "RObust Header Compression (ROHC): Framework and four profiles: RTP, UDP, ESP, and uncompressed", RFC 3095, Internet Engineering Task Force, July 2001), including section 6.5, section 6.5.1, and section 6.5.2, for example.

Depending on the packet, the snapshot can include either all the context information then existing, or (in a more economical case) only the dynamic and/or semi-static context information required for decompression of the packet header. With each context entry (snapshot) kept in window memory 72, the value of the sequence number (SN) associated with the packet is kept as an index to the entry. In one mode of operation, the context information which is stored in a snapshot in window memory 72 can be the entire context information that was current or existed at the time a packet is missing. In another and more economical mode of operation, the context information which is stored in a snapshot in window memory 72 can be only the dynamic and/or semi-static context information currently existing at the time of the packet loss. Keeping only the semi-static and dynamic information as the snapshot is possible because, e.g., the static information is already present in the context, and the static information does not change for a single flow.

The header decompression context information necessary for decompression at the time of non-receipt is obtained by decompression state machine 60 from context-updating packets received by remote unit 40, and is stored in last context snapshot memory 63. In an illustrated implementation, such snapshots of header decompression context information are obtained from last context snapshot memory 63 and are stored by window manager 66 in a window memory 72 of context snapshots. Then, when header decompressor 46(1) detects header decompression failure for a subsequently received packet, as event 6C-3 the header decompressor 46(1) determines (e.g., by executing a repair process performed by repair unit 68) whether header decompression of the subsequently received packet can be achieved using one of plural stored snapshots.

FIG. 7 shows an example sliding window 74 maintained by window manager 66 in window memory 72. Circled indicator A in FIG. 7 shows that sequence analyzer 64 has detected five gaps or holes in packet reception by the time the most recent sequence number (SN) received has the value $SN_{current}$. Consequently, a "snapshot" of the context information existing at each of the times of hole detection is inserted at five positions in window memory 72. A first window item $x_0$ in window memory 72 corresponds to the oldest hole; a second window item $x_1$ in window memory 72 corresponds to the next oldest hole; and so forth, with the window items $x_i$ being referred to as having a window sequence or window item number i. As shown in FIG. 7, the window items have indices which are based on the oldest item ($x_0$) plus an index, with the index indicating how many packets were received between the oldest items $x_0$ and the occurrence of the hole. For example, item $X_3$ of FIG. 7 indicates that a hole occurred forty two packets after the hole of item $x_0$ (item $x_0$ being $x_{ref}$). Each item $x_i$ in window memory 72 results from a detected hole, and for each item the appropriate context updating information (current context information at the time of the packet loss occurrence) is stored in the respective item.

The CnWnd Interval Size can be based in the Bandwidth-Delay product of the link where header compression is applied. This can be used to derive the reordering depth. When the oldest snapshot slides out of the window memory 72, the next oldest snapshot becomes the reference. For example, if in FIG. 7 the window memory 72 becomes full over time and the oldest snapshot slides out, then what formerly was snapshot x1 will become snapshot x0 with other snapshots being indexed relative thereto. The window depth tells how far back in the history of packets we need to keep context snapshots in window memory 72. This window starts at a point where a hole in the sequence occurred, and the upper bound is the last decompressed packet (the current context state for decompression). The reordering depth can be the maximum possible reordering that a packet can suffer over the link between compressor and decompressor, or it can be simply the maximum amount of reordering that one wants to be able to handle (can be dictated by memory constraints).

Circle indicator B, circle indicator C, circle indicator D, and circle indicator E of FIG. 7 reflect basic sub-events of event 6C-3 and various fundamental operations of the repair unit 68. Circle indicator B shows a subsequently-received packet failing decompression, with the sequence number of the failed packet not being known (and thus the failed packet is assumed to be out of order). Circle indicator C of FIG. 7 shows repair unit 68 reattempting decompression of the subsequently received packet. In the reattempted decompression, the header decompressor 46(1) uses each of the plural stored snapshots, e.g., each of the five snapshots shown in FIG. 7. Circle indicator C of FIG. 7 reflects the fact that if the subsequently received packet is not rendered decompressible using any of the snapshots, or alternatively is rendered decompressible using more than one of the snapshots, then the subsequently received packet might not be decompressible or may need further logic to resolve which of the plural candidate snapshots to use with the subsequently received packet. On the other hand, as shown by circle indicator E in FIG. 7, if the subsequently received packet is decompressed using one and only one of the snapshots in example sliding window 74, then the repair process was likely successful and has an enhanced measure of assurance regarding the resolution. In the particular scenario shown in FIG. 7, the header of the subsequently received packet which failed decompression at circle indicator B was rendered decompressible using only one of the context snapshots in 74, i.e., snapshot context Delta_C_ref2. Therefore, the header of the subsequently received packet has been decompressed and the packet can be applied to buffer manager 48 for storing in decompressed packet buffer 49.

Figure 6B:
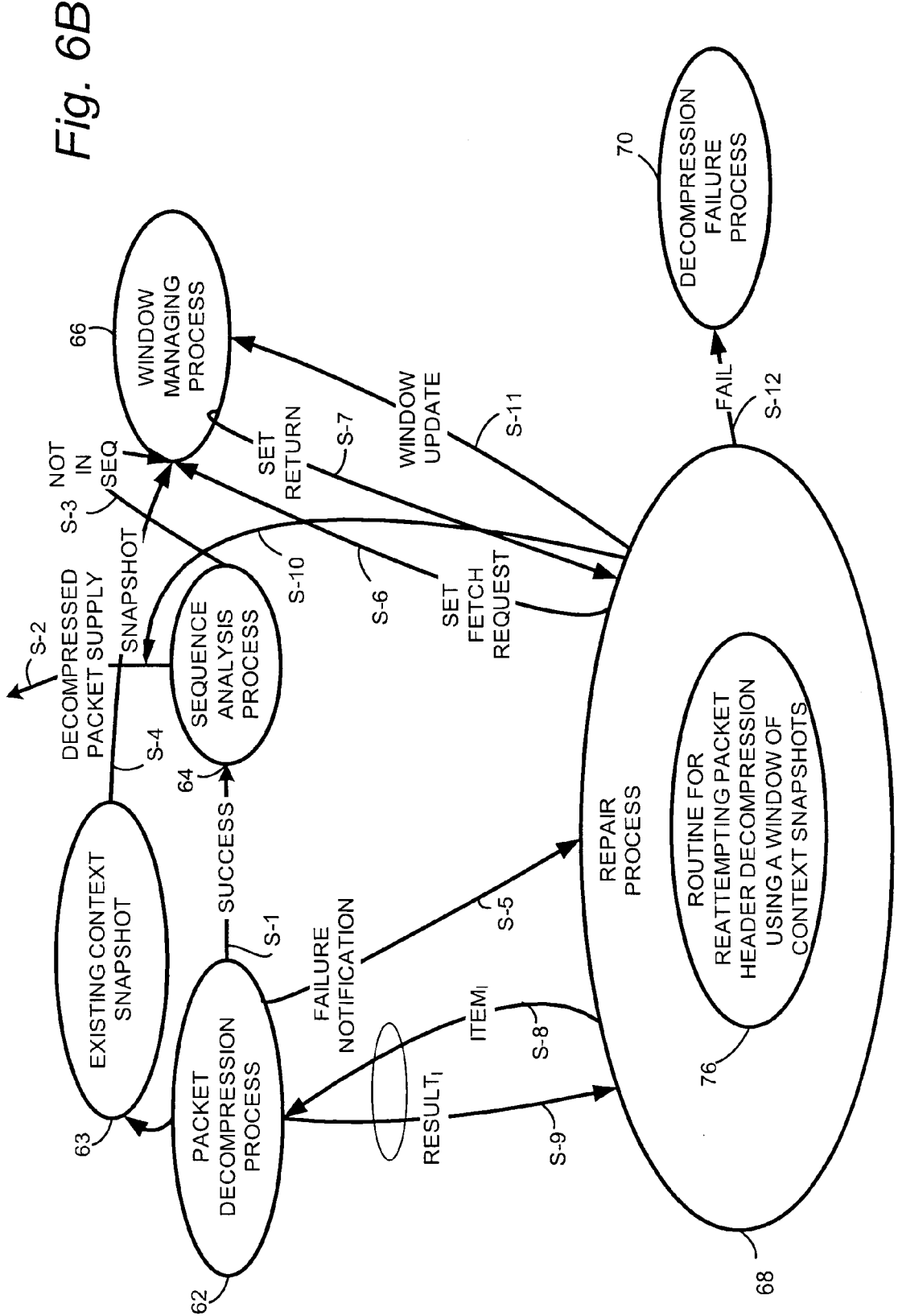
FIG. 6B is a diagrammatic view showing basic, example functional processes executed by the header decompressor of FIG. 6A.

FIG. 6B shows, in more detail, functional aspects of the out-of-sequence packet handler 54 of header decompressor 46(1) and various communications or signals transmitted therebetween. In FIG. 6B, each entity is expressed in functional terms, e.g., as a process or routine. As such, for example, the repair process 68 corresponds to repair unit 68 of FIG. 6A.

In terms of operation, FIG. 6B shows by signal S-1 that the packet header decompressor 62 apprises sequence analyzer 64 upon successful decompression of the header of a packet. The sequence analyzer 64 receives the decompressed packet and examines its sequence number. If the sequence number of the decompressed packet has a value which is in the expected order, e.g., in sequence with the sequence numbers of other decompressed packets, then the decompressed packet can be passed (via signal S-2) to buffer manager 48 for storage in decompressed packet buffer 49 (see FIG. 5). Alternatively, if the sequence number of the packet whose header was decompressed by last context snapshot memory 63 is determined by sequence analyzer process 64 not to be in sequence, then signal S-3 is sent to window manager process 66. The window manager process 66 obtains (via signal S-4) the then-existing context information from last context snapshot memory 63, and stores the context snapshot in window memory 72 at a position corresponding to a hole occasioned by the missing packet. If packet header decompressor 62 is unable to decompress a packet, a failure notification signal S-5 is sent to repair unit 68.

Those skilled in the art will understand that not necessarily the entire packet whose header was decompressed need be sent to sequence analyzer process 64, so long as at least the decompressed packet or its sequence number is sent. This assumes also that the sequence analyzer process 64 has the ability, depending on the outcome of its sequence analysis, to forward a successfully decompressed, in-sequence packet to buffer manager 48.

Figure 6D:
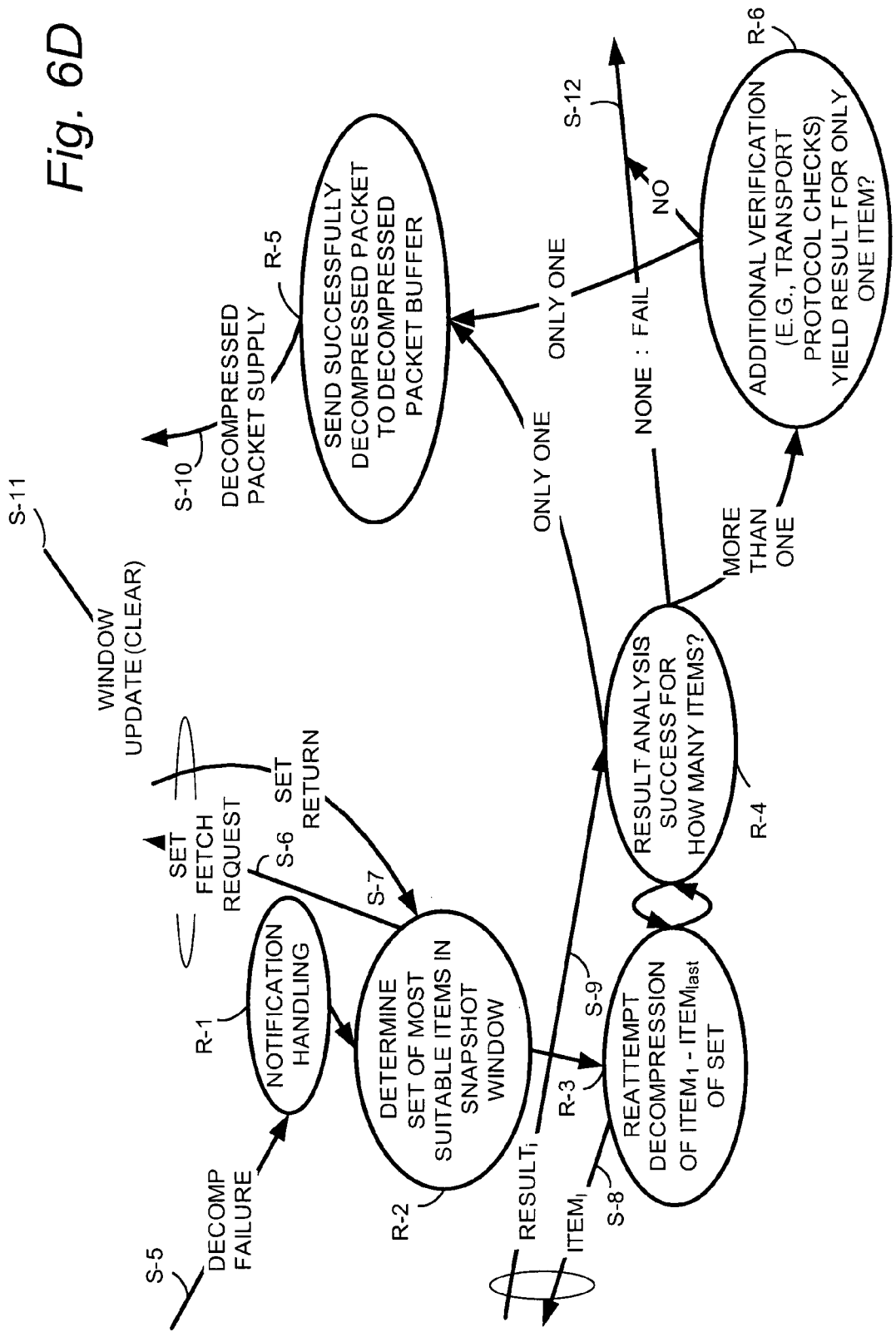
FIG. 6D is a diagrammatic view showing basic, example operations and events performed by a repair process of the header decompressor of FIG. 6A.

FIG. 6D shows basic functional aspects of repair unit 68 and the repair process performed thereby upon receipt of a failure notification signal S-5 (see FIG. 6B). The functional aspects of repair unit 68 basically correspond to the main event 6C-3 illustrated in FIG. 6C. Thus, the particularized repair events (RE) shown in FIG. 6D are essentially subsumed in one, non-limiting, example implementation of repair unit 68.

Repair event R-1 of FIG. 6D shows repair unit 68 receiving a notification. In the case of the decompression failure notification of signal S-5, such notification triggers event R-2. As event R-2, the repair unit 68 determines a set of the most suitable snapshots in the window memory 72 to use for reattempting decompression of the packet header which failed decompression. As mentioned previously, for each packet or group of consecutive packets missing in a sequence of the flow, header decompressor 46(1) stores a corresponding snapshot in a set of snapshots in sliding window memory 72. In differing modes, the header decompressor may use either all snapshots in the set, or a subset of the snapshots in the set, for reattempting decompression of the subsequently received packet that failed decompression. Repair event R-2 thus involves repair unit 68 either deciding to involve all snapshots in window memory 72, or a subset of the snapshots. In the case that a subset of snapshots are utilized, the repair unit 68 determines the constitution of the subset based on which snapshots are most likely snapshots to facilitate successful decompression, e.g., snapshots determined by packet sequence number (e.g., least significant bits of the sequence number). Thus, as event R-2, the repair unit 68 first requests or fetches a set (or subset) of items (snapshots) by sending signal S-6 to window manager 66. Window manager 66 obtains the set (or subset) of items (snapshots) from window memory 72, as sends the set (or subset) of items (snapshots) to repair unit 68 as shown by signal S-7. The set (of subset) of items (snapshots) obtained from window memory 72 hereinafter are called item$_1$ through item$_{last}$ of the set (or subset).

As event R-3, the repair unit 68 reattempts decompression of the header of the failed packet. The reattempted decompression involves a series of decompression reattempts, each reattempt involving a different one of item$_1$ through item$_{last}$. Signal S-6 of FIG. 6D and FIG. 6B shows a representative one of the items, e.g., item$_i$, being sent back to packet header decompressor 62 for the reattempted decompression. Whether a reattempted decompression using item$_i$ has meaningful results is reported via signal S-9 sent from packet header decompressor 62 and processed by repair unit 68 as event R-4.

If, after completion of all the decompression reattempts of the failed packet, it is determined that only one item (e.g., only one context snapshot) resulted in a proper decompression of the previously failed packet, then as event R-5 the repair unit 68 sends the repaired packet to buffer manager 48 (as signal S-10) for storing in decompressed packet buffer 49 (see FIG. 5). Also, as part of event R-5, the repair unit 68 sends the sequence number of the repaired packet to sequence analyzer 64. The fact that one and only one context snapshot rendered the packet header decompressible adds a measure of confidence to the decompression.

If, after completion of all the decompression reattempts of the failed packet, it is determined that more than one item (e.g., plural context snapshots) resulted in a proper decompression of the previously failed packet, then as event R-6 the repair unit 68 employs additional verification mechanisms in hopes of choosing one of the plural context snapshot candidates to use definitively for the subsequently received packet. Using additional verification mechanisms can involve, for example, transport protocol (e.g., UPD or TCP) checks. Such checks can involve checksum or cyclical redundancy checks (CRS), for example. If use of the additional verification mechanisms results in a decision that only one of the candidate snapshots resolves the packet, then as event R-5 the repair unit 68 sends the repaired packet to buffer manager 48 (as signal S-10) for storing in decompressed packet buffer 49 (see FIG. 5), and the sequence number of the repaired packet is sent to sequence analyzer 64.

On the other hand, if use of none of the snapshot items results in decompression of the packet header, then a failure notification is sent as signal S-12 to decompression failure unit/routine 70. Similarly, if at event R-6 the repair unit 68(2) is not able to resolve which of the plural snapshot candidates is optimum for decompression, then the failure notification is sent as signal S-12.

For sake of convenience, the events performed by repair unit 68 as described in FIG. 6D are collectively referred to as a routine for reattempting packet header decompression using a window of context snapshots, e.g., routine 76. Such nomenclature delineates routine 76 from another potential routine executable by repair unit 68, e.g., routine 78 which reattempts decompression of headers of buffered packets as subsequently described.

Thus, the header decompressor 46(1) performs events such as the foregoing as a first aspect of the handling of out-of-sequence packets in conjunction with packet header decompression. As such, header decompressor 46(1) maintains a sliding window of context snapshots, with each item in the window containing exactly one transitory context snapshot. The stored snapshot reflects the state of the context, as it should have been at the time where a packet (hole in the sequence) is missing (should have been received, and can be presumed reordered as well). One item is inserted in the sliding window for each (or group of consecutive) packet(s) missing in the sequence of packets in the flow. The robustness characteristics of the header compression algorithm will treat this missing packet as a packet loss, until it is eventually received. When such a sliding window is not maintained, a packet that is reordered with a depth of more than about one in the case of ROHC will not be decompressed.

The size of the sliding window preferably equals a reordering depth that the decompressor can handle. In one example implementation, the size of the window can be based on the bandwidth-delay product of the link. The oldest item in the sliding window is the maximum reordering depth that can be handled. Subsequent items can be stored in the sliding window as delta-encodings based on the oldest reference.

The repair unit 68 operates, in an example mode, by assuming that a packet which fails decompression was reordered (e.g., was out of sequence). The repair unit 68 finds in the sliding window the most likely suitable window items (context snapshots) which may be used to reattempt decompression of the failed packet. Locating the most likely suitable window items may depend or be based on packet sequence numbers, or may instead include all the context snapshots in the sliding window 74. The repair unit 68 reattempts decompression for the failed packet using, one by one, a set of the context snapshots from the sliding window 74. If decompression succeeded for exactly one item of the context window, then repair unit 68 considers the decompression a success. Otherwise the attempted repair is a failure. In the course of performing the repair process, the sliding window is updated to maintain its size corresponding to the reordering depth.

Estimation of Decompression Success Rate for Out-of-Sequence Packet Using Sliding Window As one mode of operation, it is possible to estimate the decompression success rate using the header decompressor 46(1) for an out-of-sequence packet. What now follows is a derivation of such estimation, wherein Table 1 shows notation utilized in the derivation.

TABLE 1

NOTATION FOR SUCCESS RATE ESTIMATION DERIVATION

| NOTATION | DEFINITION |
| --- | --- |
| Pr(item) | probability that the CRC verification succeeds for a decompression attempt using window item item (includes headers with residual errors) |
| Pr$_{repair}$(item) | probability that decompression of a reordered packet corresponding to window item item will succeed (excludes headers with residual errors) |
| bits(field) | number of bits for the field field in the compressed header |
| x | window item corresponding to a packet received out-of-order |
| x$_i$ | sequence number of a window item |
| c_ref | oldest context reference in the window (x$_i$ = x$_0$) |
| delta(c_ref)$_i$ | difference between the oldest context reference saved for the window item corresponding to x$_i$ |
| wnd_depth | reordering depth that the window can handle |
| cnt_wnd | window where each item contains a transitory context state corresponding to the sequence number of a packet that was not received |

In conjunction with the derivation, the following considerations apply:

Pr(x$_i$)=½^y, where y is the number of bits for the CRC (CRC-y), i !=o

Pr($x_j$) is given for when there is no dependency between each item (completely random data)—this is not the case, however, so in fact Pr($x_j$) will be even smaller.

Where xi is an item in the window of size x+1 item(s), i ∈ [0, x].

Inquiry is now made for the probability Prepair(xo) that there will be more than one value in the window, knowing that the window size is at least as large as the reordering depth of the link. Each item xi in the window has P(xi) probability of being erroneously interpreted as the correct value, where there is always only one value (xo) known to be the correct one (i.e. P(xo)=1). Thus, let Prepair(xo) be the probability that the reordered packet xo is correctly decompressed from a number of j value items saved in the window (where wnd_size is link loss/reordering rate per reordering depth):

$$Pr_{repair}(x) = Pr(x) - \sum_{j=1}^{wnd\_depth} Pr(x_j) \quad \text{Equation 1a}$$

$$Pr_{repair}(x) = 1 - \frac{(wnd\_depth - 1)}{2^{bits(CRC)}} \quad \text{Equation 1b}$$

Equation 1 yields the Table 2:

TABLE 2

| loss/reordering rate (%) | bits(CRC) | $Pr_{repair}(x) = Pr(x) - \sum_{j=1}^{wnd\_size} Pr(x_j)$ | |
|---|---|---|---|
| 1 | 3 | 1 | (1) |
| 5 | 3 | 0.48 | (0.79) |
| 10 | 3 | 0 | (0.58) |
| 1 | 7 | 1 | |
| 5 | 7 | 0.96 | |
| 10 | 7 | 0.78 | |

For each case, the values above assume that 100% of the traffic uses either one of CRC-3 or CRC-7, but not a combination. Suppose in a certain situation 90% of packets are be PT-0 or PT-1 (CRC-3), and 10% PT-2 (CRC-7), then Prepair (xo) is given by Equation 2.

$Pr\text{repair}(x)'=\Sigma \text{weight}(\text{bits}(CRC))*Pr\text{repair}(x,\text{bits}(CRC))$     Equation 2

Equation 2 yields Table 3:

TABLE 3

| loss/reordering rate (%) | weight(3) (%) | weight(7) (%) | $Pr_{repair}(x)'$ | |
|---|---|---|---|---|
| 1 | 90 | 10 | 1 | (1) |
| 5 | 90 | 10 | 0.53 | (0.81) |
| 10 | 90 | 10 | 0.08 | (0.60) |

In the derivation there is also the effect of the number of SN bits, i.e. this is valid when the number of SN bits yields such a small p that the actual value is outside the LSB interpretation interval.

Determination of Memory Requirements for Sliding Window of Context Snapshots

Consideration is now given to the total decompressor memory requirements for the context window. In order to maintain the sliding window of contexts, the cost is one extra context size for each context identifier (CID) for which the decompressor wants to handle reordering, plus a small amount for each delta from this context for each packet missing from the sequence, as shown by Equation 4.

$$sizeof(wnd) = \sum_{i=0}^{acid}\left[sizeof(context_i) + \sum_{j=1}^{wnd\_depth} sizeof(\text{delta}(context_i)_j)\right] \quad \text{Equation 4}$$

Context identifiers (CIDs) identify a compressor flow and associates it to a context. This is needed because many different flows can be compressed between the same compressor and decompressor pair. CIDs cannot relate to the $x_i$ positions shown in FIG. 7. It is the sequencing information, normally the SN field, that relates to the $x_i$ positions shown in FIG. 7. In Equation 4, acid is active cids and wnd_depth is insertion rate (average number of items per window size). For ROHC, the parameter Max_CIDs is the upper limit for acid. The worst case is when sizeof(delta(context)) is the size of dynamic fields.

Header decompression uses the LSB-encoded SN bits (use rohc notation) of the assumed reordered packet (once it has failed decompression the first time) to find (guess) the proper context reference in the window. As explained previously, in some modes it is not always needed to try all references. LSB encoding maintains a window of possible values for the LSB bits to fall in. Only one value is possible in the window. However, with reordering of packets (e.g., packets being out of sequence), the LSB bits might correspond to values that were deemed old and discarded by the compressor (i.e. the window has moved forward). So, first the decompression is attempted with the values in the LSB window. If it fails and the decompressor knows that reordering might have occured, than an "older" value can be tried for decompression.

Reattemped Decompression for Repair of Buffered Packets

Figure 9:
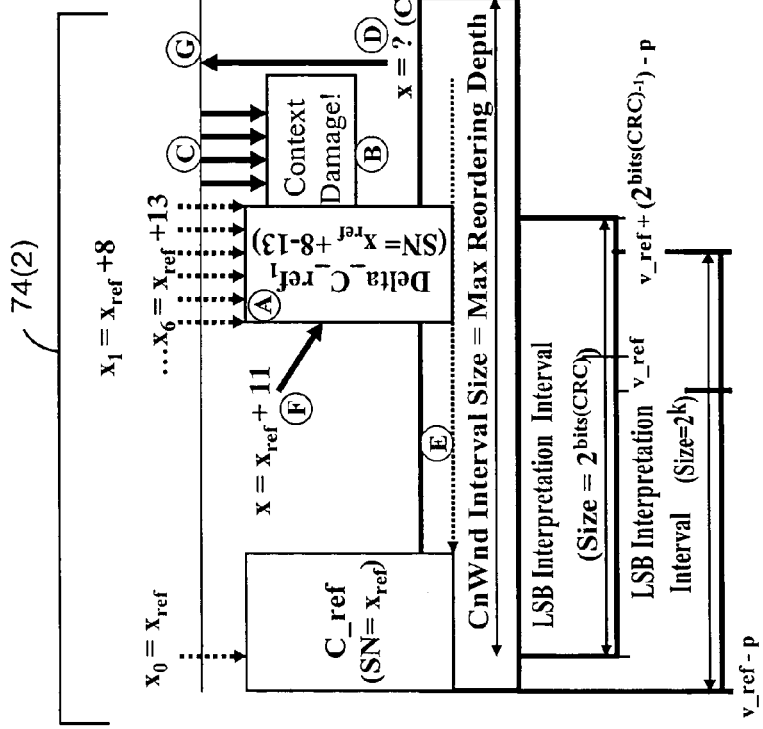
FIG. 9 is a diagrammatic view showing an example sliding window maintained in a scenario using an auxiliary repair process.

In accordance with a second independent and distinct aspect of its configuration and operation, the header decompressor can also execute an auxiliary repair process for out-of-sequence packets. FIG. 9 illustrates a scenario in which the second aspect and the auxiliary repair process can be beneficially employed.

In FIG. 9, circle indicator A depicts the fact that, as a possible result of loss of consecutive packets $x_1$-$x_6$, a significant context update was not received. In view of lack of receipt of the significant context update, the packets which are received after lost packets $x_1$-$x_6$ undergo decompression failures, as depicted by circle indicator B in FIG. 9.

Figure 8A:
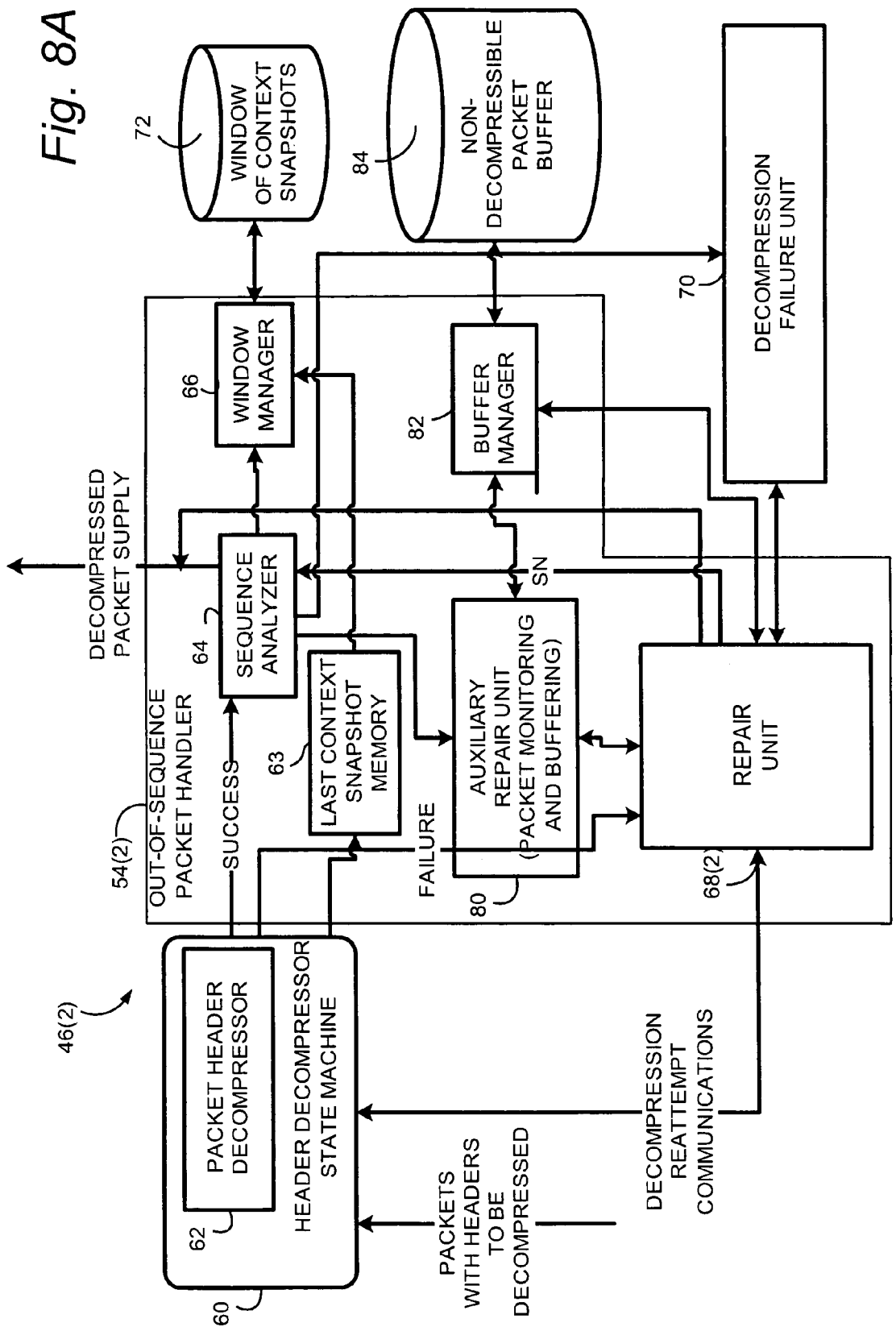
FIG. 8A is a schematic view showing basic, example functional entities of a header decompressor according to a second example aspect.
Figure 8B:
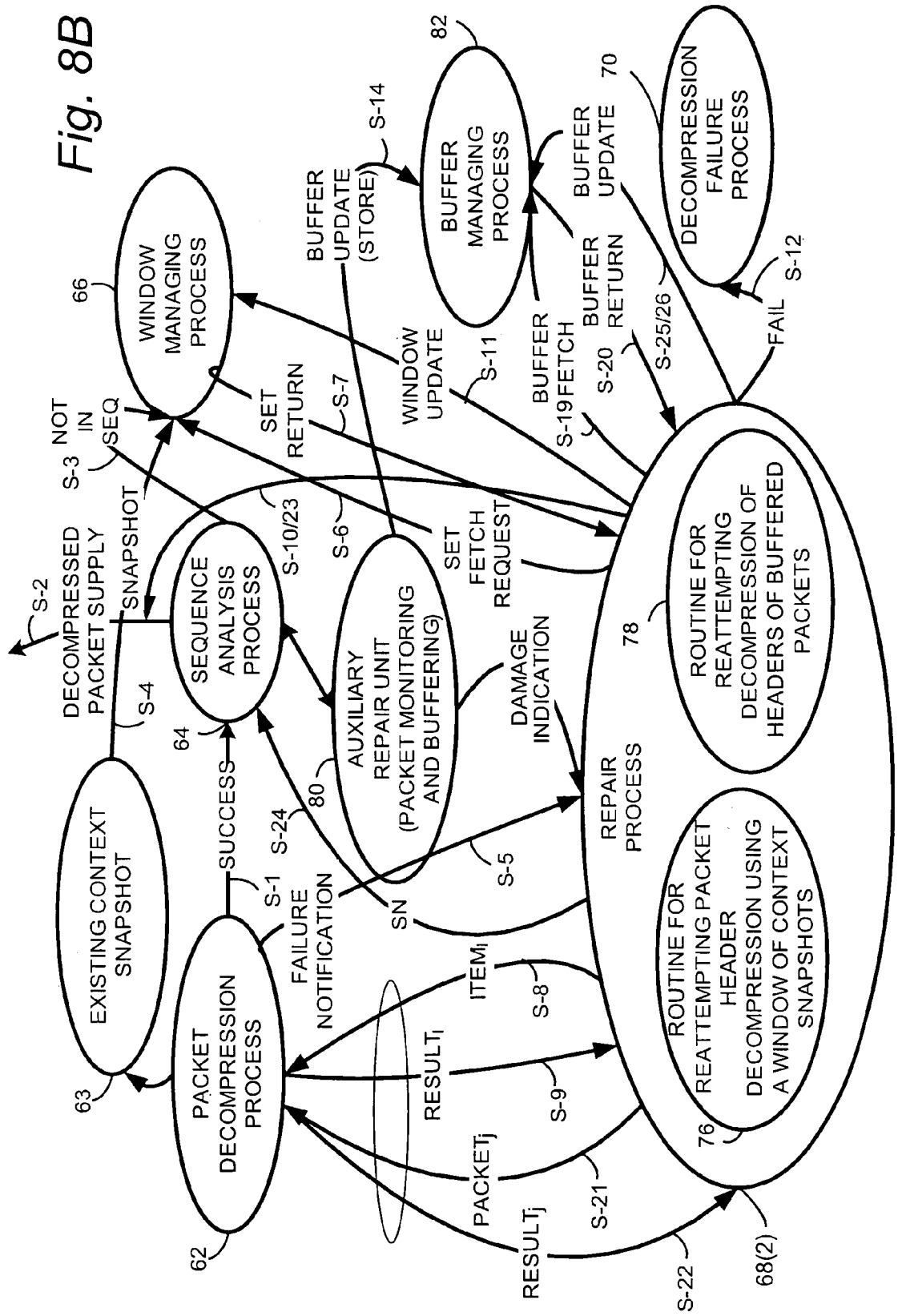
FIG. 8B is a diagrammatic view showing basic, example functional processes executed by the header decompressor of FIG. 8A.

For such a scenario, and according to the second aspect herein described, as illustrated in FIG. 8A and FIG. 8B, the out-of-sequence packet handler 54(2) of header decompressor 46(2) includes an auxiliary repair process 80 and the repair unit 68(2) includes, in addition to routine 76, a routine 78 for reattempting decompression of headers of buffered packets.

Figure 8C:
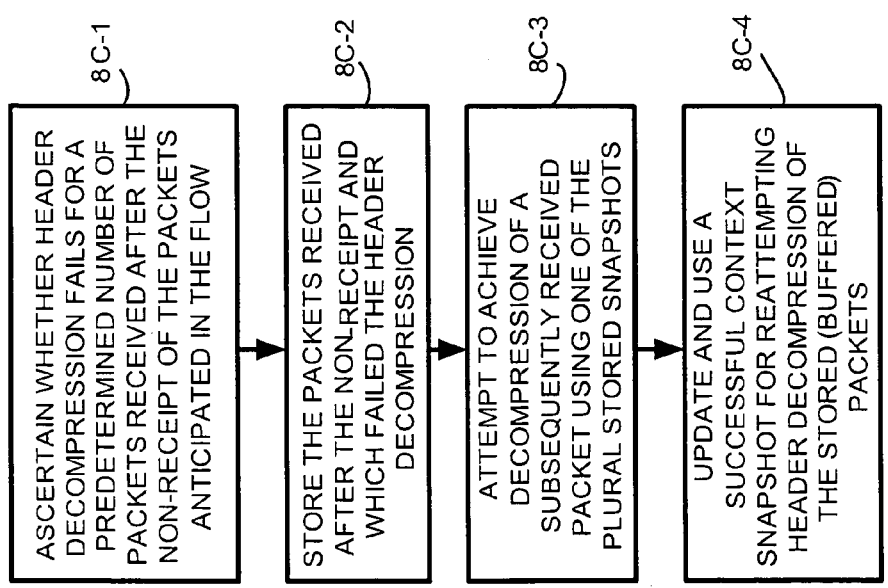
FIG. 8C is a diagrammatic view showing basic, example operations performed by the header decompressor of FIG. 8A.

FIG. 8C shows basic steps performed by the out-of-sequence packet handler 54(2) according to the second aspect which are in addition to the steps performed by the first aspect (which were described with reference to FIG. 6C). As event 8C-1, header decompressor 46(2) ascertains whether header decompression fails for a predetermined number of packets received after the non-receipt of the packets anticipated in the flow (e.g., whether the event depicted by circle indicator B in FIG. 9 indeed occurs). Such header decompression failure could possibly result from the fact that one or more of the non-received packets may have carried significant context update information, without which the header decompressor incurs "context damage". If so, as event 8C-2 header decompressor 46(2), using auxiliary repair process 80, stores the packets received after the non-receipt and which failed the header decompression (e.g., the "buffered packets"). This storing or buffering of failed packets is performed in hopes that, should it be able to recover the lost context update information, repair unit 68(2) can use such lost context update information to perform subsequent repair of the buffered packets. Such storing or buffering of decompression-failed packets is depicted by circle indicator C in FIG. 9.

Then, as indicated by event 8C-3 and circle indicators D, E, and F in FIG. 9, header decompressor 46(2) attempts to achieve decompression of a subsequently received packet using one of the plural stored snapshots (using routine 76 for reattempting packet header decompression using a window of context snapshots as previously described in conjunction with the first aspect). If a reattempted decompression of the subsequently received packet is successful using one of the context snapshots, as event 8C-4 and as shown by circle indicator G in FIG. 9, the snapshot of the header decompression context information which achieved header decompression is updated and used (e.g., by the auxiliary repair process) for reattempting header decompression of the stored (buffered) packets.

In the second aspect, achieving recovery of the decompression of the subsequently received packet using one of the plural stored snapshots is possible in two example situations. In a first such situation, the context update information necessary for decompressing the buffered packets was an out-of-order packet (treated as the subsequently received packet) which was delayed and received by the header decompressor only after the context damage was detected. In a second such situation, the context update information necessary for decompressing the buffered packets is obtained by a retransmission in another packet (treated as the subsequently received packet), as discussed below in conjunction with a third aspect.

FIG. 8A shows example structural and/or functional units of header decompressor 46(2) according to the second aspect. The header decompressor 46(2) and its associated out-of-sequence packet handler 54(2) includes the same entities previously described with respect to header decompressor 46(1) of FIG. 6A, and in addition such other entities as auxiliary repair process 80 and a buffer manager 82 which manages storing, retrieval, and removal of initially non-decompressible packets relative to packet buffer 84. In view of the fact that the packets stored in packet buffer 84 initially appear to be non-decompressible, packet buffer 84 is also referred to as the "problematic" packet buffer. As mentioned above, the repair unit 68(2) of header decompressor 46(2) includes not only routine 76 for reattempting packet header decompression using a window of context snapshots, but also routine 78 for reattempting decompression of headers of buffered packets.

FIG. 8B shows, in more detail, functional aspects of the out-of-sequence packet handler 54(2) of header decompressor 46(2) and various communications or signals transmitted therebetween, beyond those already shown and earlier described with reference to FIG. 6B. The aspects, events, and signals of FIG. 8B which are common to those of FIG. 6B are understood from the discussion of FIG. 6B and thus not repeated. Again, in FIG. 8B as with FIG. 6B, each entity is expressed in functional terms, e.g., as a process or routine. Primary among the newly included functionalities shown in FIG. 8B are those of auxiliary repair process 80 and buffer manager 82.

Figure 8D:
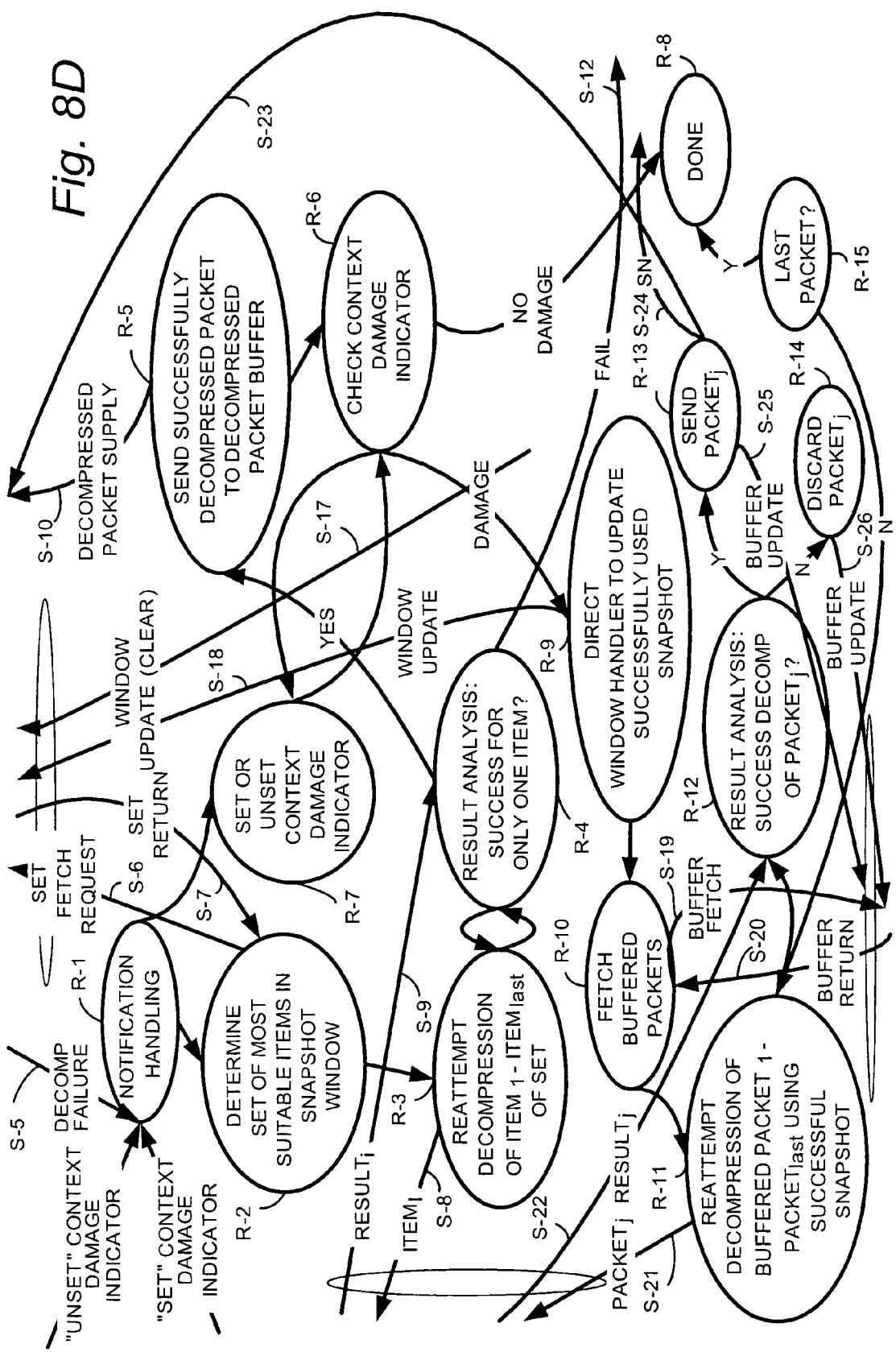
FIG. 8D is a diagrammatic view showing basic, example operations and events performed by a repair process of the header decompressor of FIG. 8A.
Figure 8E:
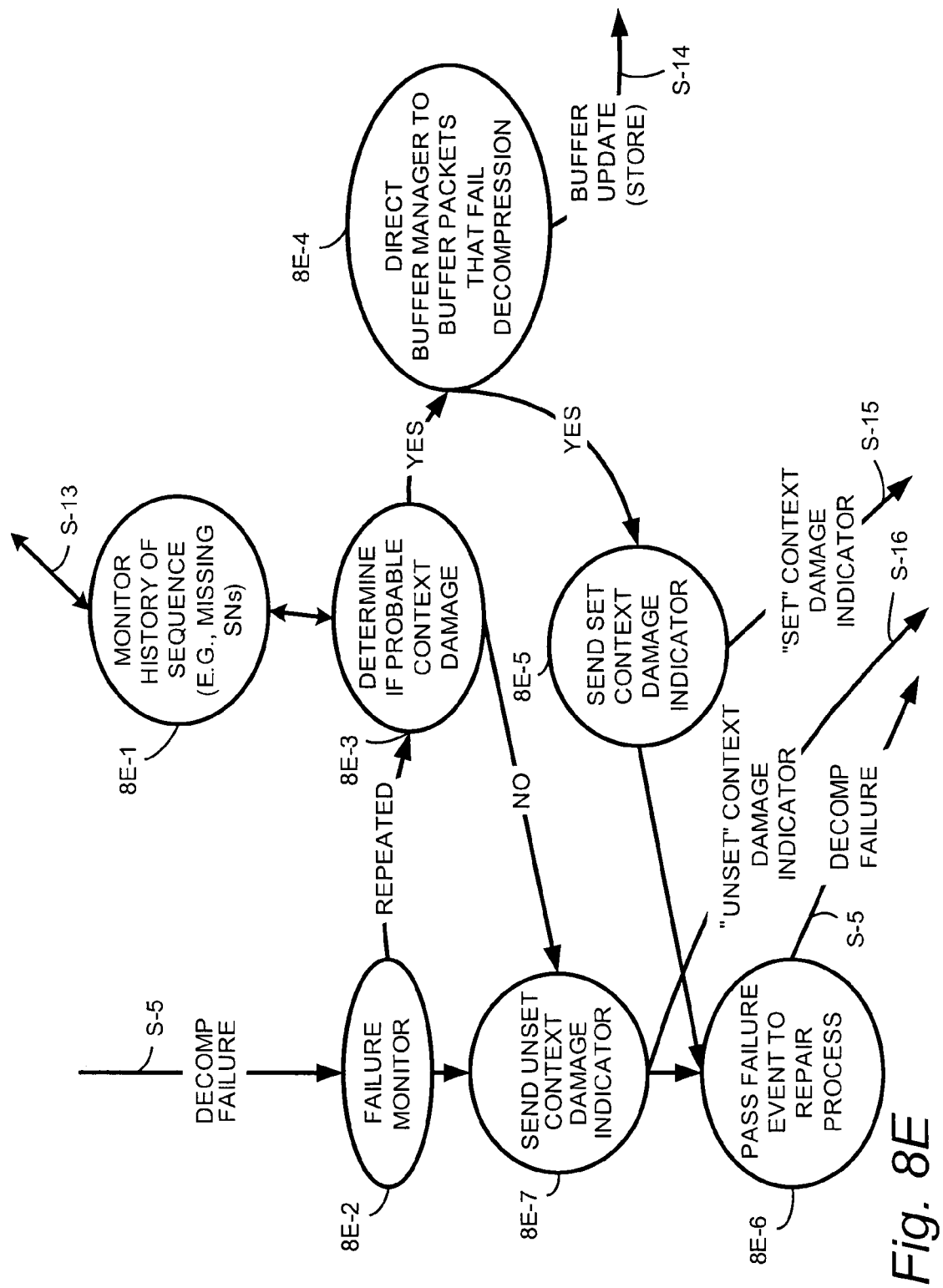
FIG. 8E is a diagrammatic view showing basic, example operations and events performed by an auxiliary repair process of the header decompressor of FIG. 8A.

Basic actions and events performed by auxiliary repair process 80 are depicted in FIG. 8E. FIG. 8E shows, for example, that as event 8E-1 the auxiliary repair process 80 monitors the history of the sequencing of packets being decompressed. In order to do so, auxiliary repair process 80 periodically communicates (via signal S-13) with sequence analyzer 64 in order to ascertain what sequence numbers have been received and what expected sequence numbers are missing.

As event 8E-2, auxiliary repair process 80 also monitors the notification of header decompression failures sent by packet header decompressor 62 as signal S-5. When a number of such header decompression failures are noted, e.g., repeated header decompression failures such as depicted by circle indicator B in FIG. 9, as event 8E-3 the auxiliary repair process 80 determines whether it is probable that the context has been damaged. If the probability of context damage exists, then as event 8E-4 the auxiliary repair process 80 requests buffer manager 82 to buffer the packet whose header has just failed decompression. Signal S-14 shows auxiliary repair process 80 sending buffer manager 82 an order to buffer the failed packet. Then, as event 8E-5 auxiliary repair process 80 sends a set context damage indicator to repair unit 68(2). In being "set", the context damage indicator informs repair unit 68(2) that context damage is suspected and that auxiliary repair process 80 is buffering packets which failed header decompression. The sending of the set context damage indicator is depicted by signal S-15. Then, as event 8E-6, auxiliary repair process 80 passes the failure event notification of signal S-5 to repair unit 68(2).

If it were determined as event 8E-3 that context damage was not probable, as event 8E-7 auxiliary repair process 80 would clear or "unset" the context damage indicator and would send the same as signal S-16. In addition, in conjunction with event 8E-6 the auxiliary repair process 80 passes the decompression failure event notification of signal S-5 to repair unit 68(2). Similarly, if it were determined as event 8E-2 that there are no repeated failures, a cleared or "unset" the context damage indicator and the decompression failure event notification of signal S-5 would be sent to repair unit 68(2).

The repair unit 68(2) of header decompressor 46(2) performs the routine 76 (for reattempting packet header decompression using a window of context snapshots) in essentially the same manner as previously described, and also in conjunction with the second aspect of header decompression performs the routine 78 for reattempting decompression of headers of buffered packets. FIG. 8D shows, in addition to the previously-described events of routine 76, the additional events for routine 78 as below discussed.

Discussion of routine 78 for reattempting decompression of headers of buffered packets resumes with event R-5 of FIG. 8D, e.g., after routine 76 has successful decompressed a packet header using one of the context snapshots stored in window memory 72. After doing so, as event R-6 routine 78 checks the context damage indicator to see whether it is "set" (and thereby indicating that auxiliary repair process 80 has buffered one or more failed packets) or "unset". The context damage indicator of routine 78 is maintained as event R-7, and is updated in accordance with the receipt and handling at event R-1 of either the "set" context damage indicator sent as signal S-15 from auxiliary repair process 80 or the "unset" context damage indicator sent as signal S-16 from auxiliary repair process 80. If the context damage indicator is unset, then as event R-8 the repair unit 68(2) completes this particular instance of its execution.

If, on the other hand, it is determined at event R-6 that auxiliary repair process 80 has determined and communicated that context damage has occurred, as event R-9 routine 78 directs window manager 66 (via signal S-18) to update the successfully-used context snapshot in window memory 72. Then routine 78 is in a position, as event R-10, to fetch the buffered packets from packet buffer 84. Accordingly, routine 78 sends a buffer fetch signal S-19 to buffer manager 82. The buffer manager 82 responds by obtaining all the packets in packet buffer 84 (all of which previously failed header decompression), and returning those packets as signal S-20 to routine 78 of repair unit 68(2).

After obtaining the decompression-failed packets from packet buffer 84, as event R-11 routine 78 reattemps header decompression of all of the buffered packets, e.g., packet$_1$ through packet$_{last}$ using the context snapshot that was most recently successful in decompressing a packet. FIG. 8D shows routine 78 sending each such packet one at a time, e.g., as packet$_j$, to packet header decompressor 62 in a signal S-21. For each packet sent to packet header decompressor 62 for reattempted header decompression, the packet header decompressor 62 returns a result signal S-22. As event R-12, routine 78 analyses the result signal S-22 for each packet$_j$ to ascertain whether the reattempted header decompression was successful. If the header of the packet was successfully decompressed by routine 78, then as event R-13 the routine 78 of repair unit 68(2) sends the successfully header-decompressed packet to buffer manager 48 (via signal S-23) for storing in decompressed packet buffer 49 (see FIG. 5). Also, as part of event R-5, as signal S-24 the repair unit 68 sends the sequence number of the repaired packet to sequence analyzer 64. In addition, repair unit 68(2) sends a signal S-25 to buffer manager 82 to remove the successfully header-decompressed packet from packet buffer 84.

If the header of the packet was unsuccessfully decompressed by routine 78, then as event R-14 the repair unit 68(2) must make a decision either to discard (remove) the troublesome packet from packet buffer 84, or to retain the packet in packet buffer 84 until a more definitive determination can be made that the packet is really lost. FIG. 8D shows via signal S-26 the repair unit 68(2) directing the buffer manager 82 to discard or remove the still troublesome packet from packet buffer 84.

As event R-15 the routine 78 determines whether header decompression has been reattempted for all packets in packet buffer 84 using the successful context snapshot. If header decompression has been reattempted for all packets in packet buffer 84, then routine 78 finishes its instance of execution as indicated by event R-16. Otherwise, the reattempted header decompression of the remaining buffered packets continues.

Thus, in the second aspect of handling out-of-sequence packets in conjunction with header decompression, header decompressor 46(2) maintains the sliding window of references, e.g., context snapshots, as in the first aspect. The header decompressor 46(2) buffers (e.g., in packet buffer 84) packets that fail decompression. The buffering is done under the assumption that when decompression fails repeatedly for a number of packets after one or more consecutive packets have gone missing, context damage can have occurred if a significant update was not received. A significant update is an update that is not covered by the robustness properties of the encoding of the SN bits and functions established in relation to that field, e.g. semi-static fields, or fields that do not vary often. It can also be an update representing a substantial jump in the SN field and/or fields for which functions based on the SN are established (i.e. Timestamp (TS), IP indentifier (IP-ID)). In such case, header decompressor 46(2) assumes that the missing packets have been delayed due to reordering, and that this caused the repeated failures. It is further assumed that a packet that has failed decompression can also have failed because it was itself reordered, in which case the Window-based Repair described above with reference to routine 76 is invoked. If the Window-based repair succeeds for a packet, header decompressor 46(2) updates (in the sliding window) the context item that was used to decompress the packet, and then reattempts decompression of buffered items for which the updated window item might be suitable. If the repair of one or more buffered item succeeds, the reordered packet decompressed using Window-based Repair was very likely properly decompressed. On the other hand, if the repair fails, buffered items may be discarded.

Concerning FIG. 9, the packet that is successfully decompressed in circle indicators D, E, and F, is a packet that arrives out-of-order with respect to the packets that repeatedly fail decompression, i.e. that was received after the context was damaged. This packet contained the necessary information to update the context to a state satisfactory for the packets that previously failed decompression to be properly decompressed. Note that if decompression of buffered packets succeeds, this provides even more guarantees that the reordered packet was correctly decompressed as well, using the right reference.

Figure 10:
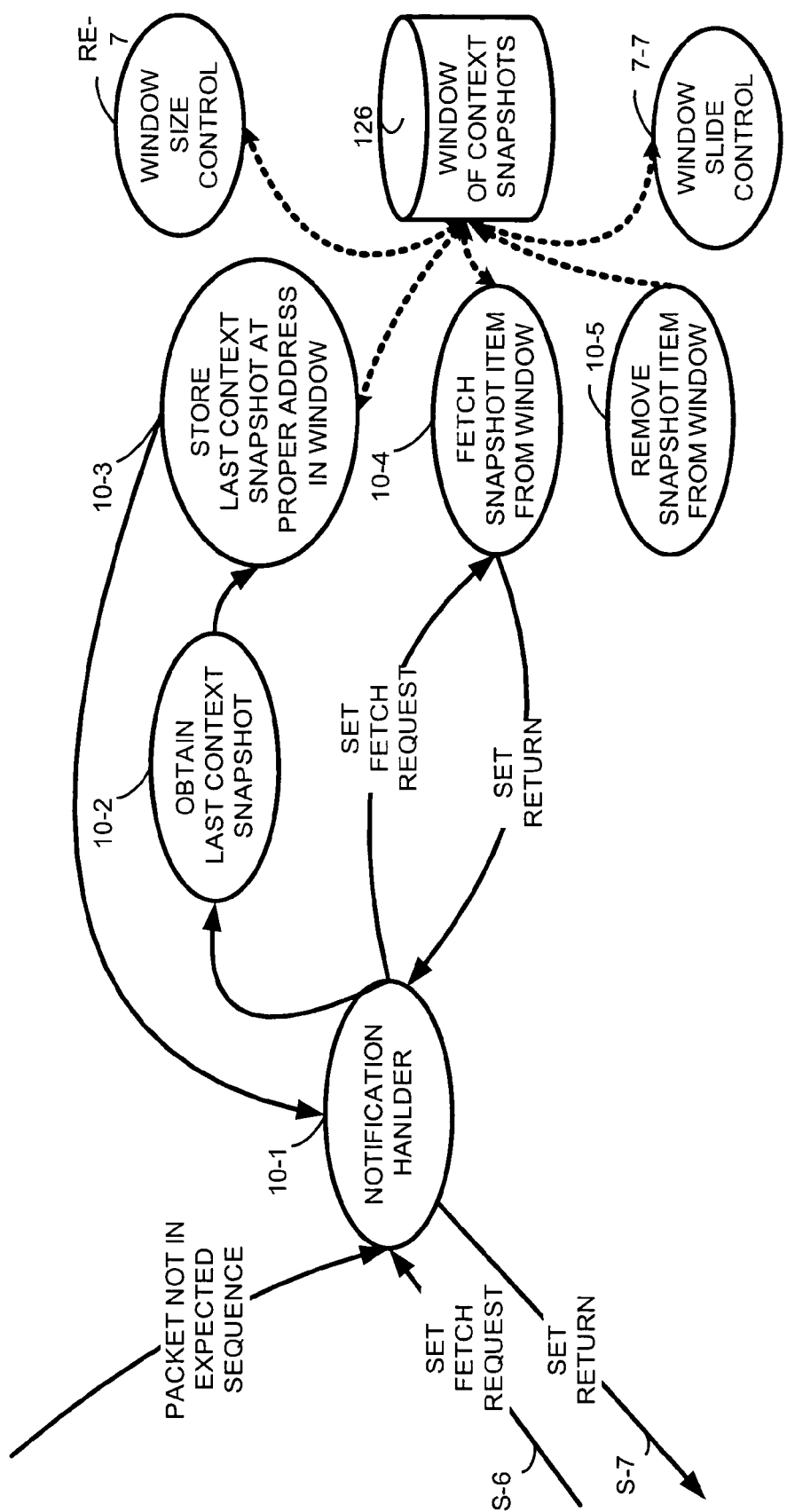
FIG. 10 is a diagrammatic view showing basic, example operations performed by a window manager in conjunction with header decompression.

FIG. 10 shows basic, example operations performed by window manager 66 in conjunction with the header decompressor 46(2). Many of these example operations also apply to operation of the window manager 66 in conjunction with the header decompressor 46(1). As event 10-1 the window manager 66 handles any notifications or interfacing communications. For example, if window manager 66 obtains an indication from sequence analyzer 64 that a sequence number of the decompressed header of the most recently received packet was out of sequence, as event 10-2 the window manager 66 obtains the last context snapshot from last context snapshot memory 63, and then as event 10-3 stores the last context snapshot at the proper location in window memory 72. On the other hand, when window manager 66 receives a set fetch request (e.g. signal S-6) from routine 76 of repair unit 68, as event 10-4 the window manager 66 fetches and returns the appropriate set of snapshots from window memory 72 (the set fetch response being, e.g., signal S-7).

As event 10-5 the window manager 66 updates the window memory 72 by, e.g., clearing a particular snapshot when appropriate. As mentioned above, the sliding context window 74 has a specified size (e.g., a product of bandwidth and delay), so that oldest entries therein shift out a discharge end of the sliding context window 74 as newer entries come in an input end of sliding context window 74. Event 10-5 thus manages the clearing of the oldest snapshot from the sliding context window 74, with the result that any snapshot that cycles out the discharge end of the sliding context window 74 is presumed to be associated with a hole that is an irrevocable packet loss. Similarly, if a snapshot in sliding context window 74 is used successfully to decompress a packet, and thereafter it is determined that the successfully-used snapshot is not sequentially-contiguous (in terms of, e.g., sequence number) with another hole in packet reception (e.g., is not adjacent another snapshot in sliding context window 74), then the successfully-used snapshot can also be cleared from window memory 72 The clearance of the successfully-used snapshot can occur since there is no adjacent snapshot which might have context information dependent upon the context information of the cleared snapshot. In addition, as needed the window manager 66 performs event 10-6 for controlling the dimensioned size of the sliding window 74, as well as event 10-7 for controlling the slide or shifting of contents through the sliding window.

Figure 11:
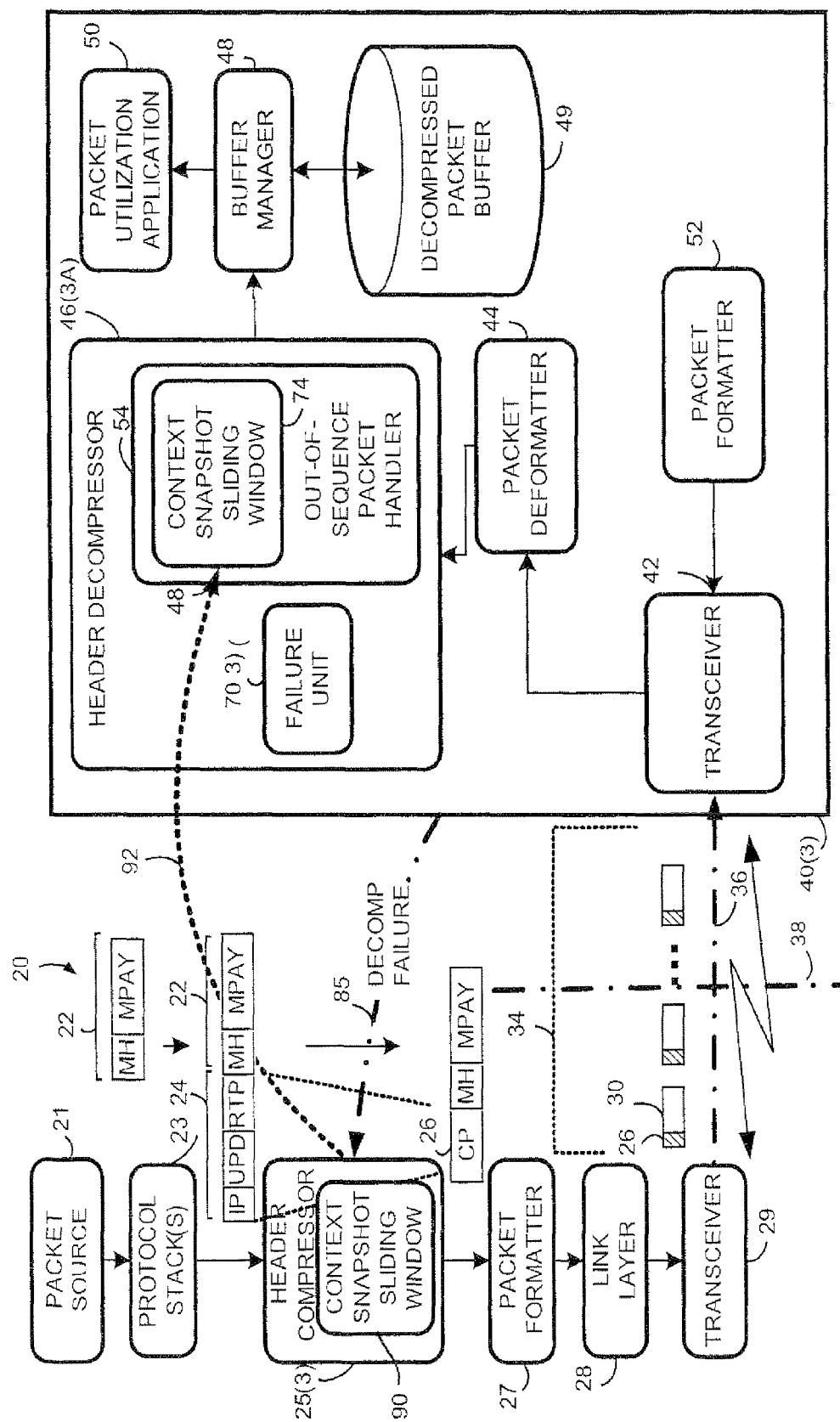
FIG. 11 is a diagrammatic view showing a generic telecommunications system illustrating a third aspect wherein notification is provided to a compressor of the fact of non-receipt of packets anticipated by a decompressor.

Selective Repair of Context Damage Using Decompressor-Triggered Compressor Retransmission FIG. 11 generically illustrates the third independent and distinct aspect of its configuration and operation, wherein when out-of-sequence packet handler 54(3) fails to decompress one or more packet headers, the remote unit 40(3) generates and sends to header compressor 24(3) a notification indicative of the fact that the header decompressor 46(3) is or likely is experiencing decompression difficulties (e.g., decompression failure).

Figure 11A:
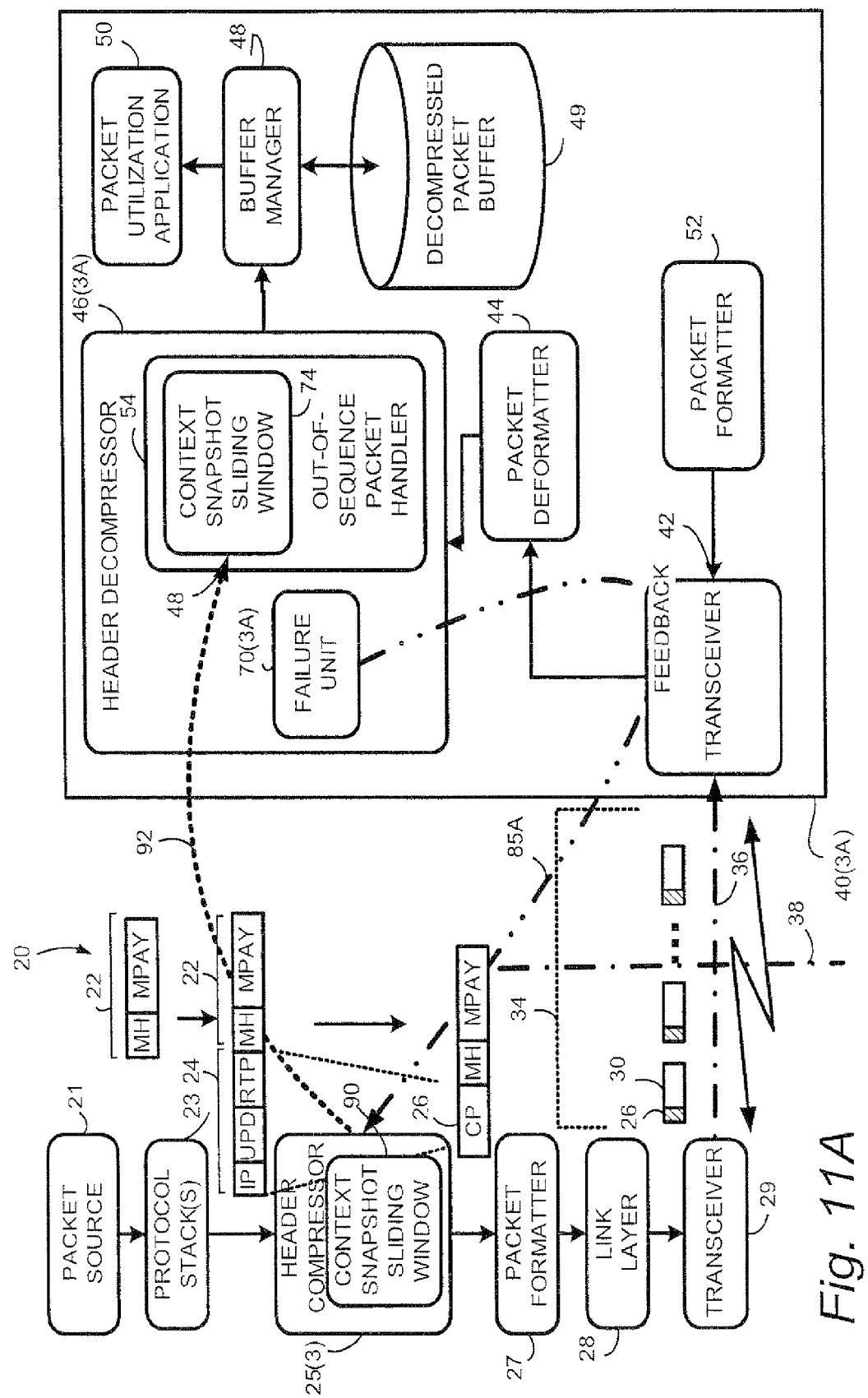
FIG. 11A is a diagrammatic view showing a generic telecommunications system illustrating the third aspect wherein notification is provided via an in-band feedback signal from the decompressor
Figure 12A:
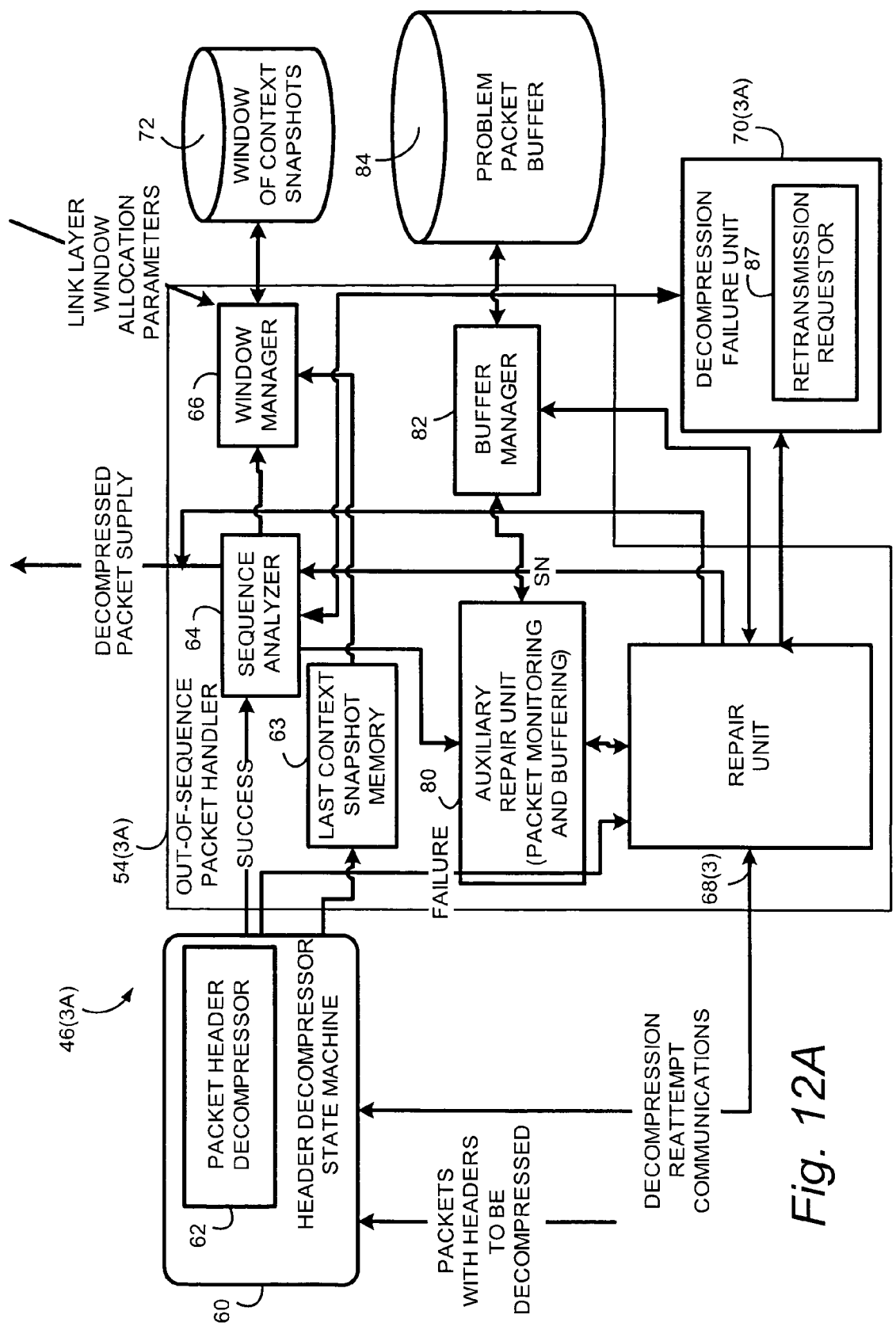
FIG. 12A is a schematic view showing basic, example functional entities of a header decompressor according to the third example aspect wherein the header decompressor comprises a retransmission requestor.

As a first example implementation of the third aspect, FIG. 11A and FIG. 12A illustrate an example embodiment wherein upon failure of header decompressor 46(3A) to decompress a packet header, the header decompressor 46(3) generates a notification 85A to the header compressor 25(3A) of the fact of non-receipt of packets anticipated in the flow. In this regard, FIG. 11A shows that header decompressor 46(3) is provided with a decompression failure unit/routine 70(3) which generates the notification 85A. Thus, the notification illustrated in FIG. 11A takes the example form of an in-band feedback notification 85A.

Figure 11B:
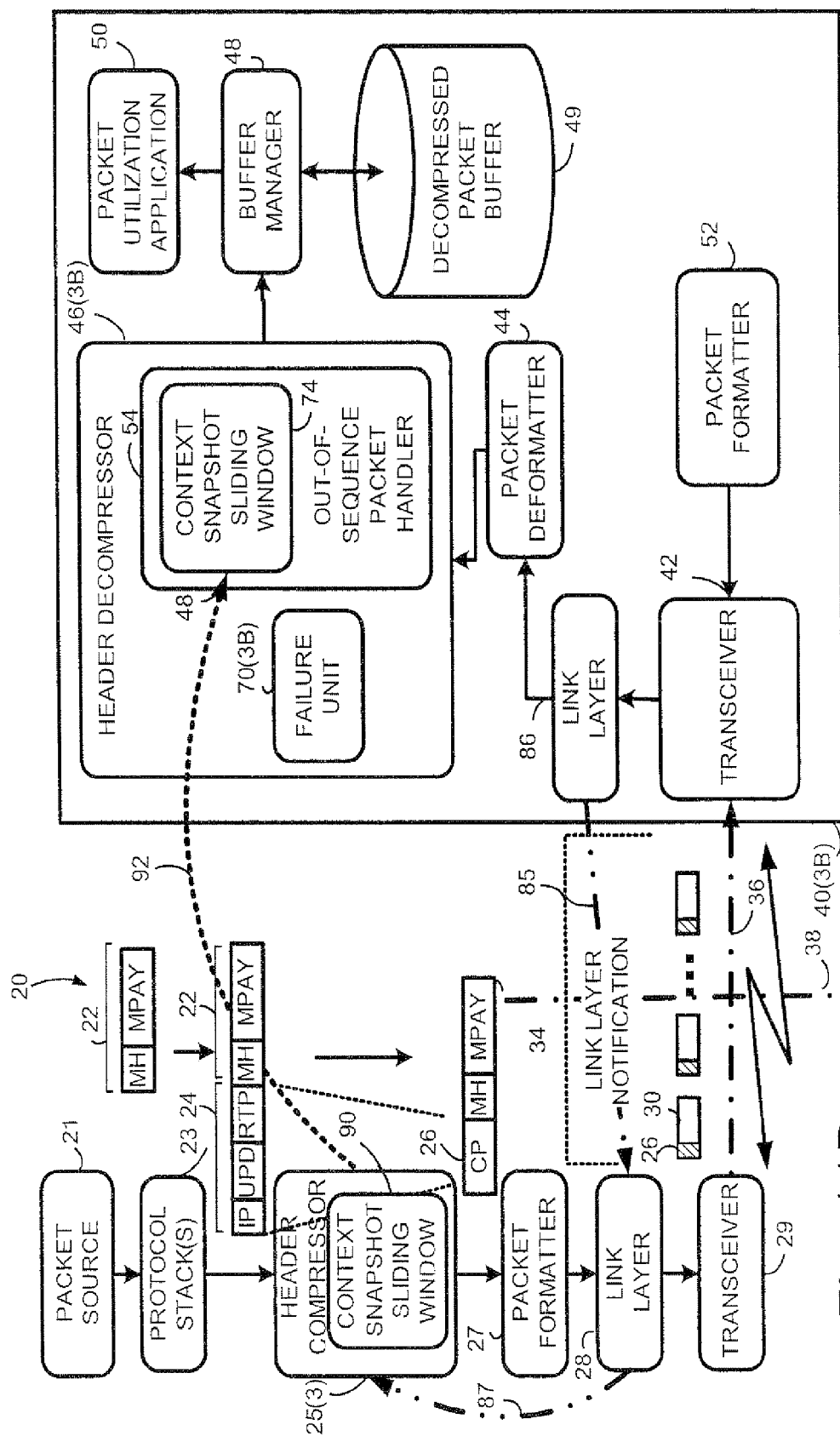
FIG. 11B is a diagrammatic view showing a generic telecommunications system illustrating a third aspect wherein notification is provided via link layer messaging.
Figure 12B:
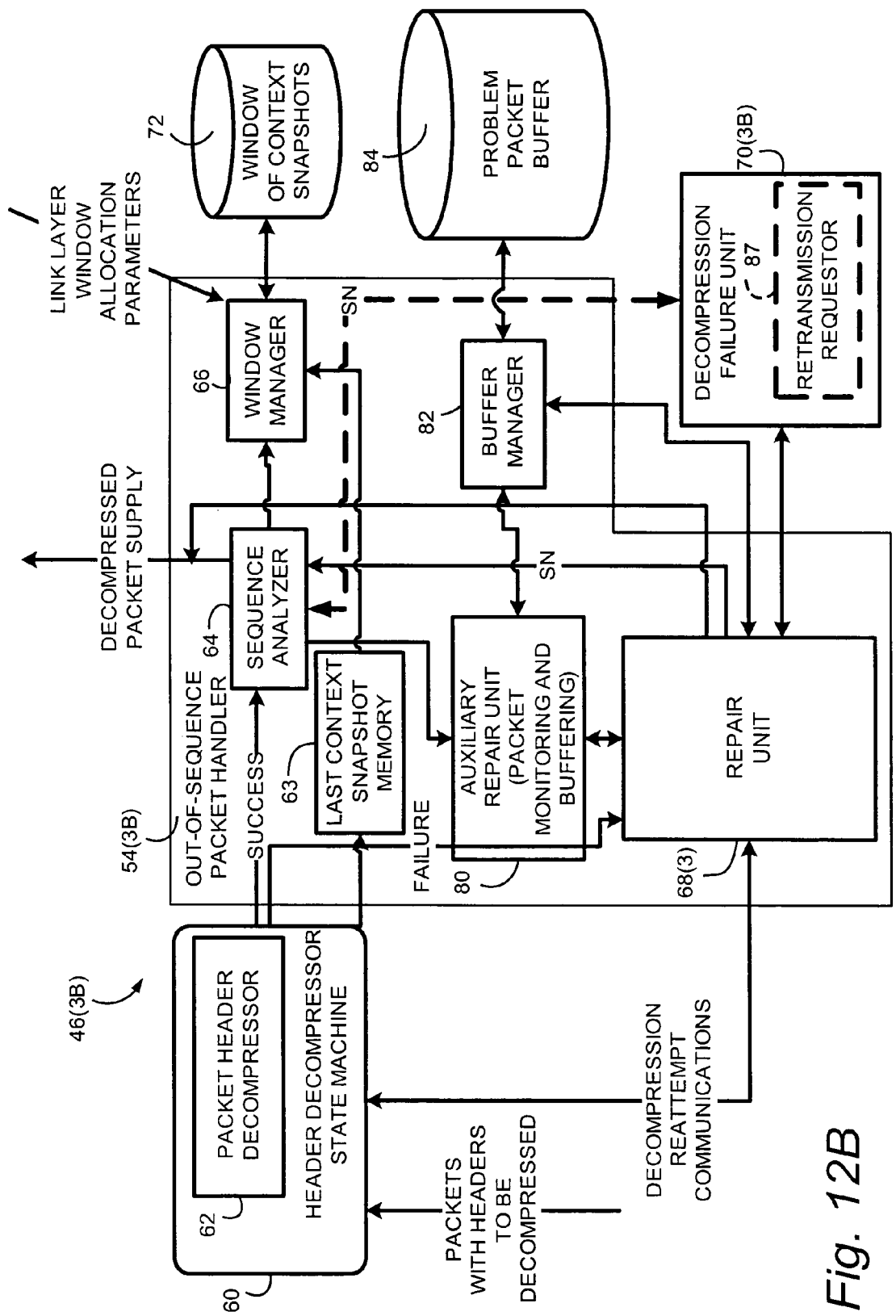
FIG. 12B is a schematic view showing basic, example functional entities of a header decompressor according to a third example aspect wherein the header decompressor comprises a link layer loss notifier.

As a first example implementation of the third aspect, FIG. 11B and FIG. 12B illustrate an example embodiment wherein link layer processing 86 discerns an event such as packet reception failure, for example, and sends a link layer notification 85B to the counterpart link layer processing 28. The counterpart link layer processing 28 then notifies the header compressor 25(3B) of actual, anticipated, or expected, packet decompression difficulties, as indicated by arrow 87.

FIG. 12A and FIG. 12B respectively illustrate the two example implementations of header decompressor 46(3A) and header decompressor 46(3B) illustrated in FIG. 11A and FIG. 11B. In the header decompressor 46(3) of FIG. 12A, the decompression failure unit/routine 70(3A) includes retransmission requestor 87. Alternatively, in the header decompressor 46(3B) of FIG. 12B, the decompression failure unit/routine 70(3B) can optionally include a retransmission requestor 87 (as shown in broken lines), although the FIG. 12B embodiment features the link layer notification of FIG. 11B.

Both the feedback notification 85A of the FIG. 11A and FIG. 12A embodiment, and the link layer notification 85B of the FIG. 11B and FIG. 12B embodiment, serve to trigger selective retransmission of packets from the header compressor 25(3). Thus, as reflected by these two alternate implementations, the compressor selective retransmission can be the result of either a notification from the link layer to the compressor 25(3), e.g., that several losses occurred (using link layer loss notification 85B), or a decompressor retransmission request, e.g., feedback (using retransmission requestor 87).

The repair process utilized by header decompressor 46(3A) of the FIG. 11A embodiment or the repair process utilized by header decompressor 46(3B) of the FIG. 11B embodiment can be either the repair process of FIG. 6D which utilizes only routine 76) or the repair process of FIG. 8D which, in addition to using routine 76, also utilizes routine 78 (for reattempting decompression of headers of buffered packets). Such is the case whether the header decompressor 46(3) takes the form of FIG. 12A with its retransmission requestor 87, or the form of FIG. 12B with its link layer loss notification 85B, or any other form.

Figures 12C, 12D:
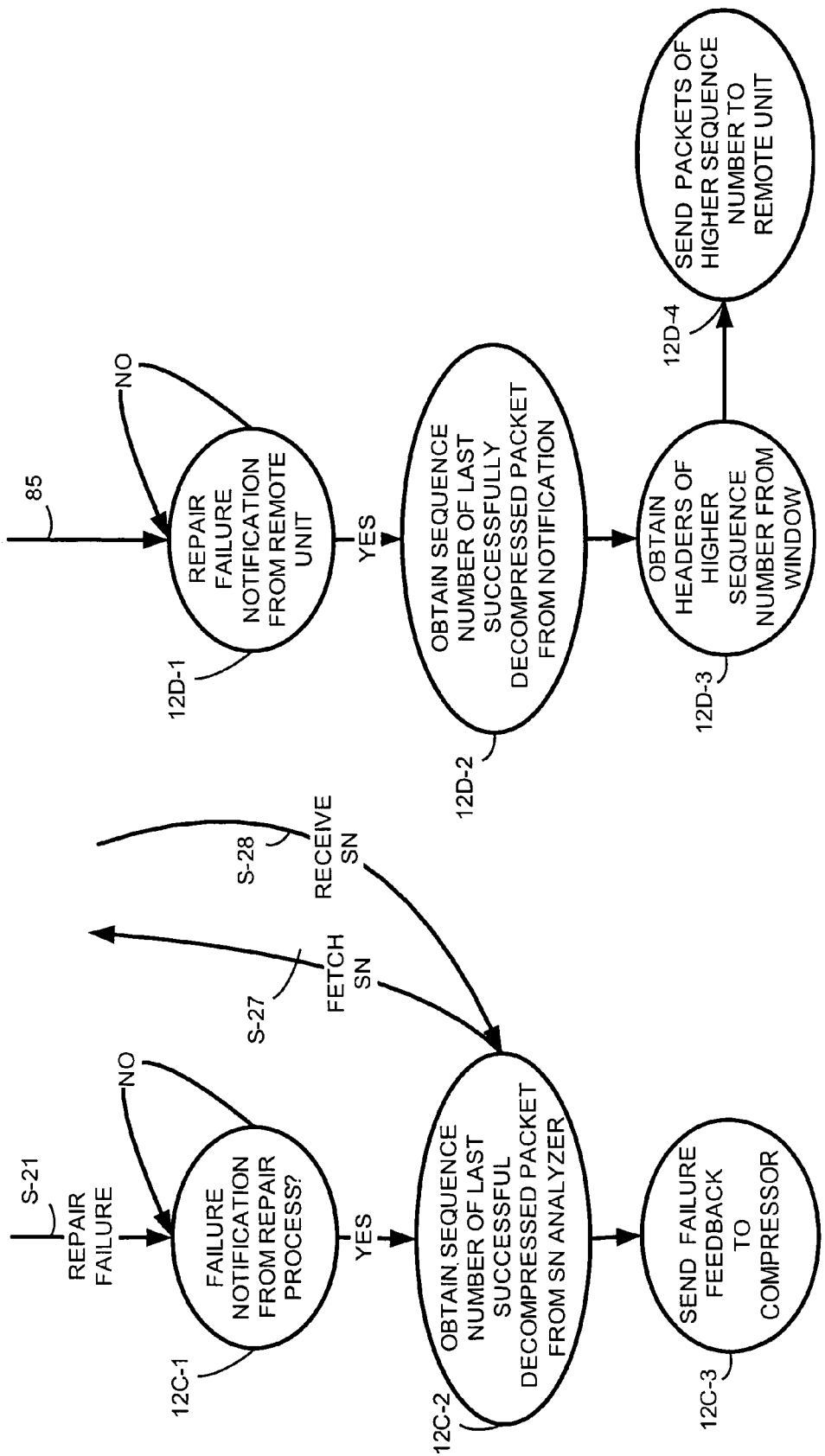
FIG. 12C is a diagrammatic view showing selected, basic, example operations performed by the header decompressor of either FIG. 12A or FIG. 12B.
FIG. 12D is a diagrammatic view showing selected, basic, example operations performed by the header compressor of FIG. 11 upon receipt of a feedback notification.

Basic example events or actions performed by decompression failure unit/routine 70(3A) are illustrated in FIG. 12C. Action of decompression failure unit/routine 70(3A) is initiated as event 12C-1, which is receipt and handling of a failure to repair notification (e.g., signal S-21) from the repair unit 68 which reattempted the decompression. Upon receiving such a failure to repair notification, as event 12C-2 the decompression failure unit/routine 70(3A) fetches (from sequence analyzer 64) the sequence number of the last packet whose header was successfully decompressed. The fetching of the sequence number of the last packet whose header was successfully decompressed is depicted by signal S-27 in FIG. 12C, while the return from sequence analyzer 64 or other advisory regarding the sequence number is shown as signal S-28. Event 12C-3 shows decompression failure unit/routine 70(3A) including the sequence number of the last packet whose header was successfully decompressed in the failure notification that is provided via feedback notification 85A (see FIG. 11A) to header compressor 25(3A).

According to this third aspect, in either the FIG. 11A or the FIG. 11B mode of implementation, the header decompressor 46(3) triggers the compressor selectively to re-send context updating packets. The re-sending of context updating packets is either triggered by a failure notification from the link layer (e.g., using link layer notification 85B), or in response to a negative acknowledgement 85A from the decompressor (e.g., using retransmission requestor 87). As explained with reference to FIG. 12C, such feedback usually contains the sequence number of the last successfully decompressed packet.

In order to retransmit the proper compressed packet, the compressor 25(3) maintains a compressor sliding context window 90 which is substantially equivalent to the decompressor sliding window 74. The similarity and correlative nature of sliding context window 74 and compressor sliding context window 90 is depicted by dotted arrow 92 in FIG. 11.

FIG. 11, as well as FIG. 11A and FIG. 11B, show that header compressor 25(3) maintains a compressor sliding context window 90. Each item in compressor sliding context window 90 includes or consists of one compressed header that has been sent to remote unit 40. Not all compressed headers generated by header compressor 25(3) need be included in compressor sliding context window 90. Compressed headers which certainly are included in compressor sliding context window 90 are those which are meant to update one or more fields of the context (other than the fields pertaining to the functions established with respect to the sequence number (SN)). Specifically, the compressed headers inserted into compressor sliding context window 90 are those which update fields other than the SN, IP-ID or RTP timestamp (TS) fields. A compressed header that is meant to update the functions established with respect to the sequence number (SN) can also be inserted into the compressor sliding context window 90.

As with sliding context window 74 maintained by header decompressor 46(3), the window size compressor sliding context window 90 equals the reordering depth that the compressor 25(3) can handle. Similarly, the oldest item residing in compressor sliding context window 90 is the maximum reordering depth that can be handled. The size of the compressor sliding context window 90 can, like the size of sliding context window 74, be based on the link bandwidth-delay product.

FIG. 12D illustrates basic actions or events performed by header compressor 25(3) upon receiving a feedback notification 85 from header decompressor 46(3), e.g., either from retransmission requestor 87 or link layer 86, or any other such repair failure notifier. When header compressor 25(3) determines as event 12D-1 that feedback notification 85 as been received, as event 12D-2 the header compressor 25(3) obtains the sequence number included in the feedback notification 85. The sequence number included in the feedback notification 85 should be the sequence number of the last packet whose header was successfully decompressed by header decompressor 46(3). Then, as event 12D-3, header compressor 25(3) obtains from its compressor sliding context window 90 the information which would allow header decompressor 46(3) to repair the context. Typically, this information involves one or more items compressed headers from compressor sliding context window 90 having sequence number higher in sequence than the sequence number received in the feedback notification 85. As event 12D-4 the header compressor 25(3) transmits the context repair information (e.g., one or two snapshots in the compressor sliding context window 90 having a higher sequence number) in packets to remote unit 40.

The retransmission by header compressor 25(6) of packets of higher sequence number can be useful for the decompressor in the event of high losses and/or reordering rate (e.g., out-of-sequence rate). In the case of losses, fewer packets will be lost. In the case of reordering, packets that cannot be decompressed until the delayed packet is received can be decompressed quicker, assuming that the retransmission beats the delayed packet over the link (which, while possible, has a low probability of occurring). In addition, the header compressor 25(3) upon receiving the feedback from the decompressor should perform the same repair actions (lower the compression for some packets), i.e., this logic is an addition, not a replacement.

Notifications to Decompressor Concerning Reordering

Figure 13:
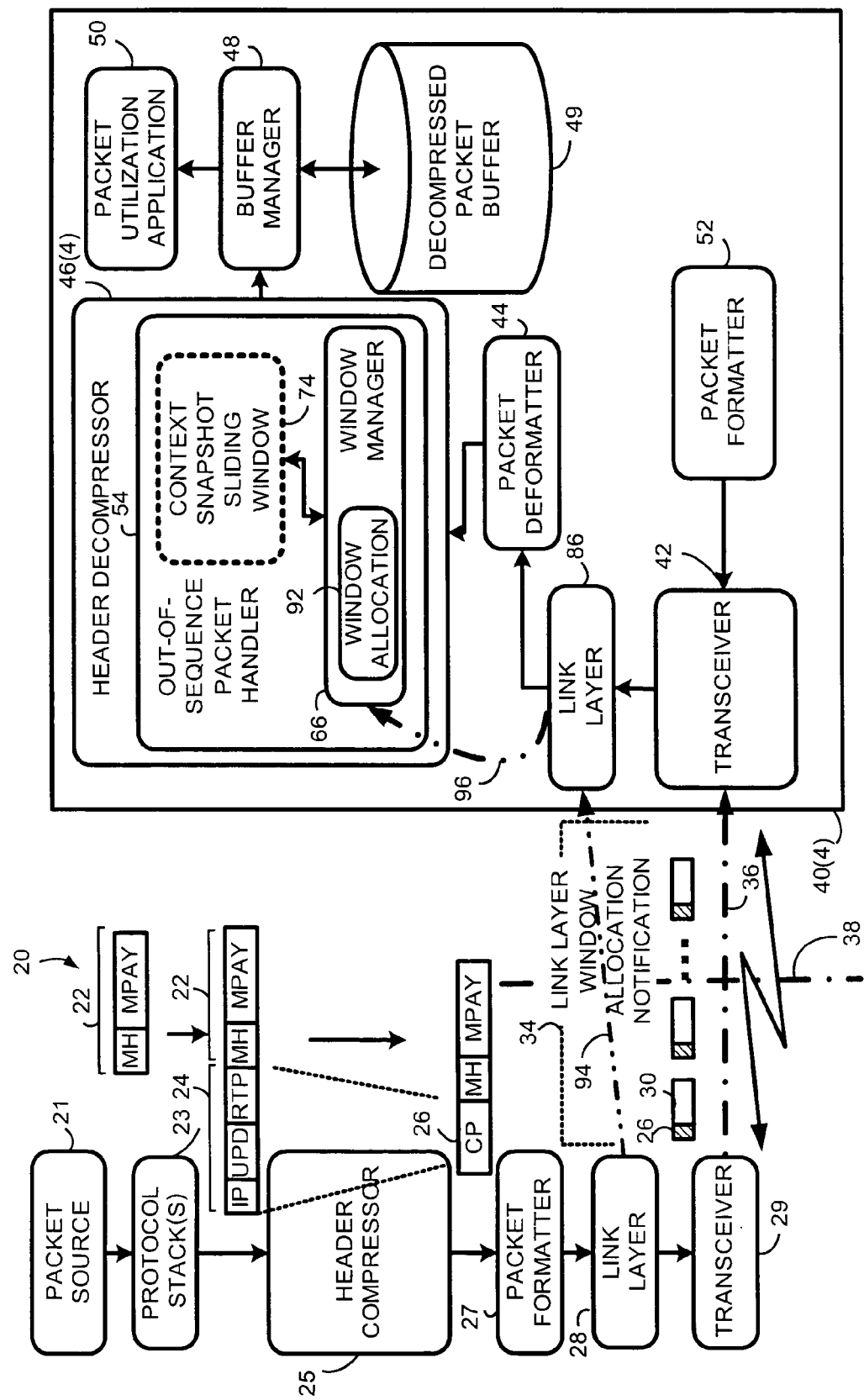
FIG. 13 is a diagrammatic view showing a generic telecommunications system illustrating a four aspect wherein a header decompressor temporarily allocates reusable memory for plural stored snapshots in accordance with a one or more window parameters.
Figure 14:
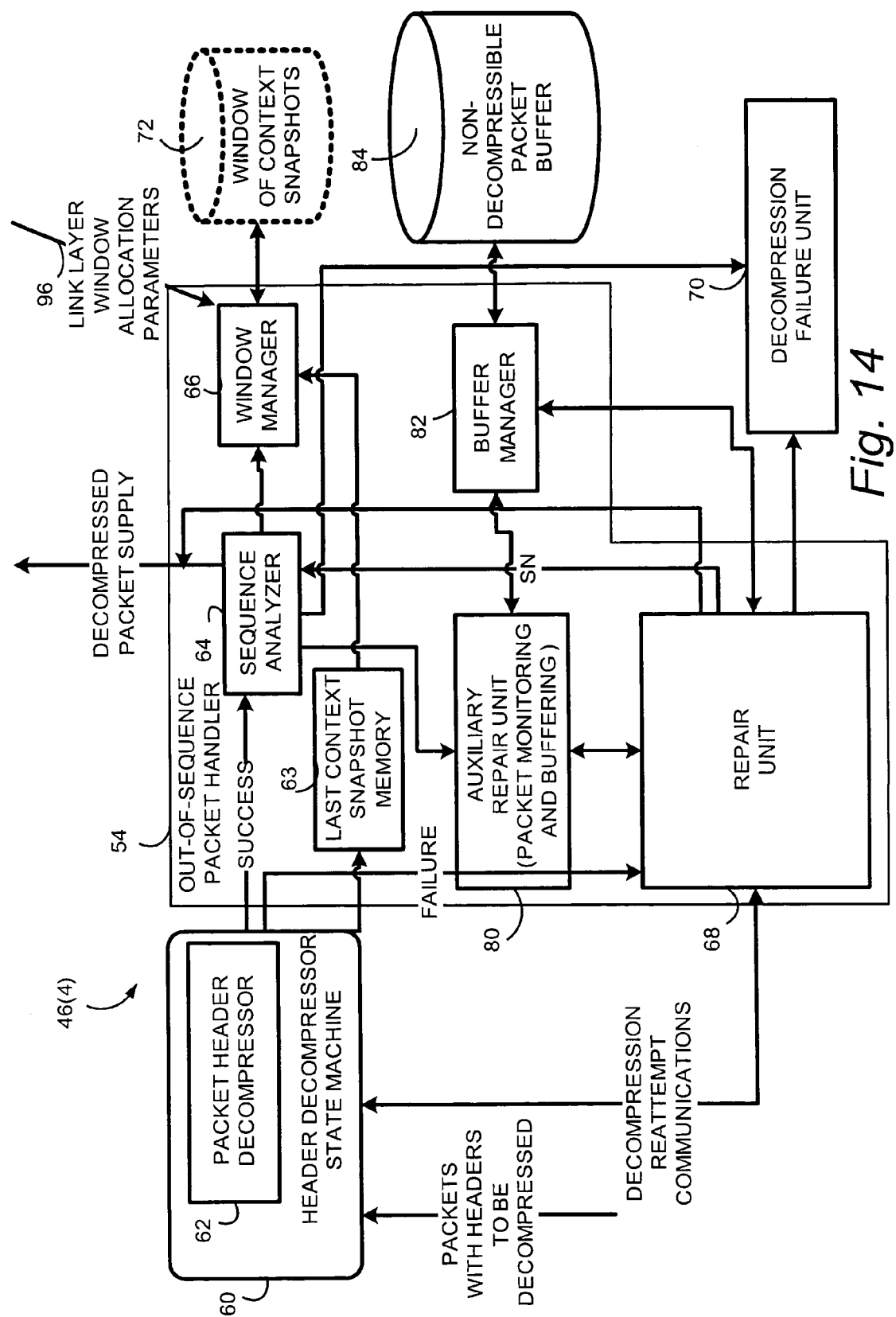
FIG. 14 is a schematic view showing basic, example functional entities of a header decompressor according to the fourth example aspect of FIG. 13.

In accordance with a fourth independent and distinct aspect of its configuration and operation, FIG. 13 and FIG. 14 show a header decompressor 46(4) which temporarily allocates reusable memory for plural stored snapshots in accordance with a one or more window parameters transmitted to the remote unit 40(4). In the example illustrated in FIG. 13 and FIG. 14, the remote unit 40 receives notification via the link layer regarding likely times that the sliding context window 74 will be needed or useful, and advises a window allocation process 92 of window manager 66 to allocate the necessary locations in memory for window memory 72. FIG. 13 specifically shows (by link layer message 94) the link layer 28 on the network side advising link layer processing 86 in the remote unit 40 of the need for allocating window memory 72, and the link layer processing 86 relaying the window allocation direction and information (via signal 96) to window allocation process 92.

To reflect the fact that window memory 72 may be temporarily allocated in accordance with this forth aspect, sliding context window 74 is shown in broken lines in FIG. 13 and FIG. 14.

The parameter(s) transmitted in the sliding window allocation message (such as, for example, the link layer message 94) can indicate one or more (and preferably all) of the following: a size of the reusable memory in which the plural stored snapshots are stored; when to allocate the reusable memory for storing the plural stored snapshots; when to de-allocate the reusable memory for storing the plural stored snapshots.

In accordance with this fourth aspect, the header decompressor imposes additional memory and processing requirements for the sliding window memory only selectively, e.g., at times indicated by the window parameters. Advantageously, using this fourth aspect, the memory locations allocated for the sliding window memory can be temporarily allocated and elsewise utilized when the repair process is not invoked or anticipated. Likely times for invoking or anticipating the repair process for the header decompressor, and thus allocation of the sliding window memory, include handoffs and handovers of various types, or any other time or period when packets may be prone to be out of order or prone to loss. Such times can be determined by measurement or predicted by historical (likelihood) information.

Thus, the link layer or other network function can notify the decompressor when a period with reordering (or a possible increase in loss rate) is occurring or is likely to occur. The notifications should include: Information about beginning of the period (start_event); Information about the end of the period (start_stop); The extent of the reordering depth (depth). When receiving a start_event notification, the decompressor can then begin filling a window of size depth with a complete reference, and fill it gradually with new items when packets are missing in the sequence in order to perform window-based repairs when a packet fail decompression. The decompressor can also buffer packets that still fail decompression after having performed the window-based repair in order to later attempt Buffer-based repairs when a reordered packet is successfully decompressed.

This fourth aspect renders the additional memory and processing requirements only required during the time when reordering (or increased losses) can occur. This signal can be relevant e.g. when handoffs occur or when the link quality decreases—leading to higher FER and/or more link layer retransmissions. This can provide memory savings, as the decompressor may not want to keep a history of context constantly—only when useful.

It will be appreciated that while window memory 72 and packet buffer 84 have been illustrated in the example implementations as being in separate memories, such need not be the case. In fact, both window memory 72 and packet buffer 84, when utilized, can have respective locations in the same memory device. Such memory device can take any of several forms, including random access memory (RAM) or semiconductor memory, for just two non-exhaustive examples.

In the example implementations, the remote terminal is a user equipment unit which receives packets (with compressed headers) over the air interface. As mentioned above, other forms or remote units are possible. When the remote terminal takes the form of a user equipement unit, the headers are preferably compressed using Robust Header Compression (ROHC) in U/O-mode, but can instead compressed using other techniques such as SigComp, for example. SigComp is described in, e.g., the following documents (all of which are incorporated herein by reference in their entireties): Price, R. et al., "Signaling Compression (SigComp)", RFC3320, Internet Engineering Task Force, December 2002; Hannu, H. et al., "Signaling Compression (SigComp)—Extended Operations", RFC3321, Internet Engineering Task Force, December 2002; US Patent Publication US 2004/0047301. The header decompressor typically determines a header decompression failure (e.g., for the subsequently received packet) by inability to verify the header decompression using cyclic redundancy check (CRC) or transport layer checksum for the subsequently received packet.

The more detailed illustrative embodiments provided above which show specific units, functionalities, and signals are not constraining, mandatory, or restrictive, but serve merely as example implementations.

Figure 15A:
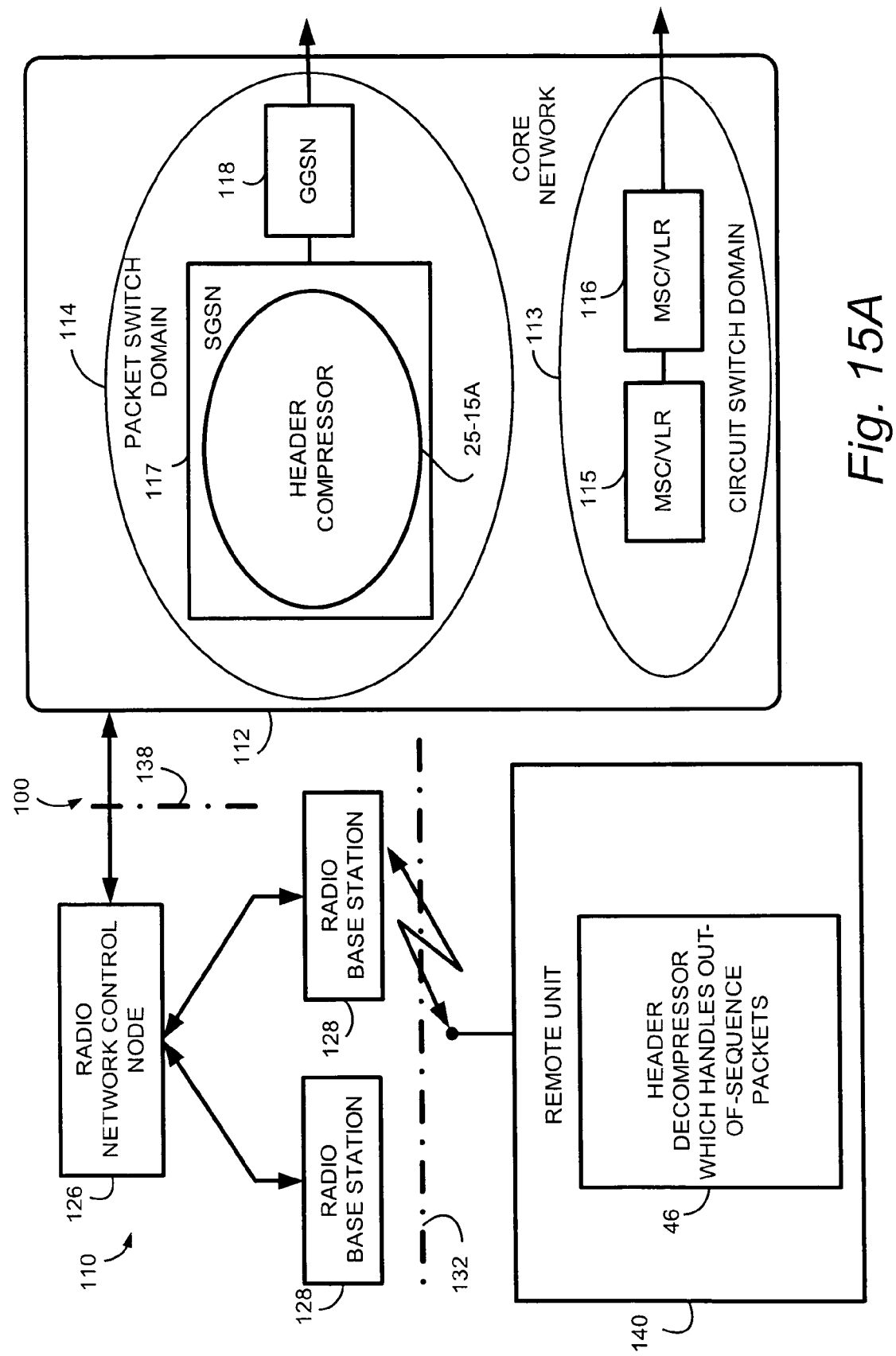
FIG. 15A is a schematic view of a particular telecommunications system which serves as an example context in which the present invention may be employed, and wherein a header compressor is included in a General Packet Radio Service (GPRS) Service (SGSN) node.

A non-limiting example environment of implementation of the foregoing network is a telecommunications network 100 such as that shown in FIG. 15A. The example telecommunications network 100 includes both a radio access network 110 and a core network 112. The core network 112 is shown as comprising a circuit switch domain 113 and a packet switch domain 114. In the particularly illustrated example, the circuit switch domain 113 (e.g., a PSTN/ISDN connection-oriented network) is shown as comprising a Mobile Switching Center (MSC)/Visiting Location Register node 115 and a Gateway MSC node 116. The packet switch domain 114 is illustrated in example fashion as including a General Packet Radio Service (GPRS) Service (SGSN) node 117 which is connected to a Gateway General Packet Radio Service (GPRS) support node (GGSN) 118.

Gateway GRPS support node (GGSN) 118 provides the interface towards the packet-switched networks (e.g., the Internet, X.25 external networks) and as such serves to translate data formats, signaling protocols and address information in order to permit communication between the different networks. Serving GPRS Support Node (SGSN) 117 provides packet routing to and from a SGSN service area, and serves GPRS subscribers which are physically located within the SGSN service area. Serving GPRS Support Node (SGSN) 117 provides functions such as authentication, ciphering, mobility management, charging data, and logical link management toward the user equipment unit. A GPRS subscriber may be served by any SGSN in the network depending on location. The functionality of Serving GPRS Support Node (SGSN) 117 and Gateway GRPS support node (GGSN) 118 may be combined in the same node, or may exist in separate nodes as shown in FIG. 15A.

In the FIG. 15A embodiment, the General Packet Radio Service (GPRS) Service (SGSN) node 117 of core network node 112 is also shown as hosting the header compressor 25-15A. The structure and operation of header compressor 25-15A is essentially similar to that of the generic, representative header compressor 25 described previously.

The core network 112 connects to radio access network 110 over a radio access network interface depicted by dot-dashed line 122. The radio access network 110 includes one or more control nodes 126 and one or more radio base stations (BS) 128. In an example, non-limiting implementation in which radio access network 110 is a UMTS Terrestrial Radio Access Network (UTRAN), the radio access network interface depicted by dot-dashed line 122 is known as the Iu interface, and the control nodes 126 take the form of radio network controllers (RNCs). The person skilled in the art understands the function and constituency of radio network control node 126, such as a diversity handover unit, controller (s), and various interfaces, for example. In other implementations of radio access network 110, the control nodes 126 can have other names, such as base station controller (BSC), radio network control node, etc. In any event, it should be understood that, for sake of simplicity, the radio access network 110 of FIG. 15A is shown with only one control node 126, with the control node 126 being connected to two base stations (BS) 128. As understood by those skilled in the art, the radio access network 110 typically has numerous control nodes 126, which can be connected over an unillustrated interface (such as an Iur interface).

Again for sake of simplicity, only two base station nodes 128 are shown connected to the representative control node 126. It will be appreciated that a different number of base stations 128 can be served by each control node 126, and that control nodes 126 need not serve the same number of base stations. Further, those skilled in the art will also appreciate that a base station is sometimes also referred to in the art as a radio base station, a node B, or B-node.

For brevity it is assumed in the ensuing discussion that each base station 128 serves one cell. It will be appreciated by those skilled in the art, however, that a base station may serve for communicating across the air interface for more than one cell. For example, two cells may utilize resources situated at the same base station site. Moreover, each cell may be divided into one or more sectors, with each sector having one or more cell/carriers.

A remote unit 140 communicates with one or more cells or one or more base stations (BS) 128 over a radio or air interface 138. In differing implementations, the remote unit 140 can be known by different names, such as remote terminal, wireless terminal or wireless unit, mobile station or MS, mobile terminal or MT, or user equipment unit (UE), for example. Of course, whereas for ease of illustration only one remote unit 140 shown in FIG. 15A, each base station typically serves many remote units.

In the example UMTS implementation mentioned above, radio access is preferably based upon Wideband, Code Division Multiple Access (WCDMA) with individual radio channels allocated using CDMA spreading codes. Of course, other access methods may be employed.

The remote unit 140 has a header decompressor 25-15A which features the out-of-sequence packet handler 54. The structure and operation of remote unit 140 and of header decompressor are can be, for example, any of the header decompressors with their associated out-of-sequence packet handlers 54 as aforedescribed in conjunction with any of the aspects hereof. Other unillustrated components of remote unit 140, including the structure and operation of a constituent transceiver, protocol stacks, decoders, buffers, and the alike are understood by the person skilled in the art.

Figure 15B:
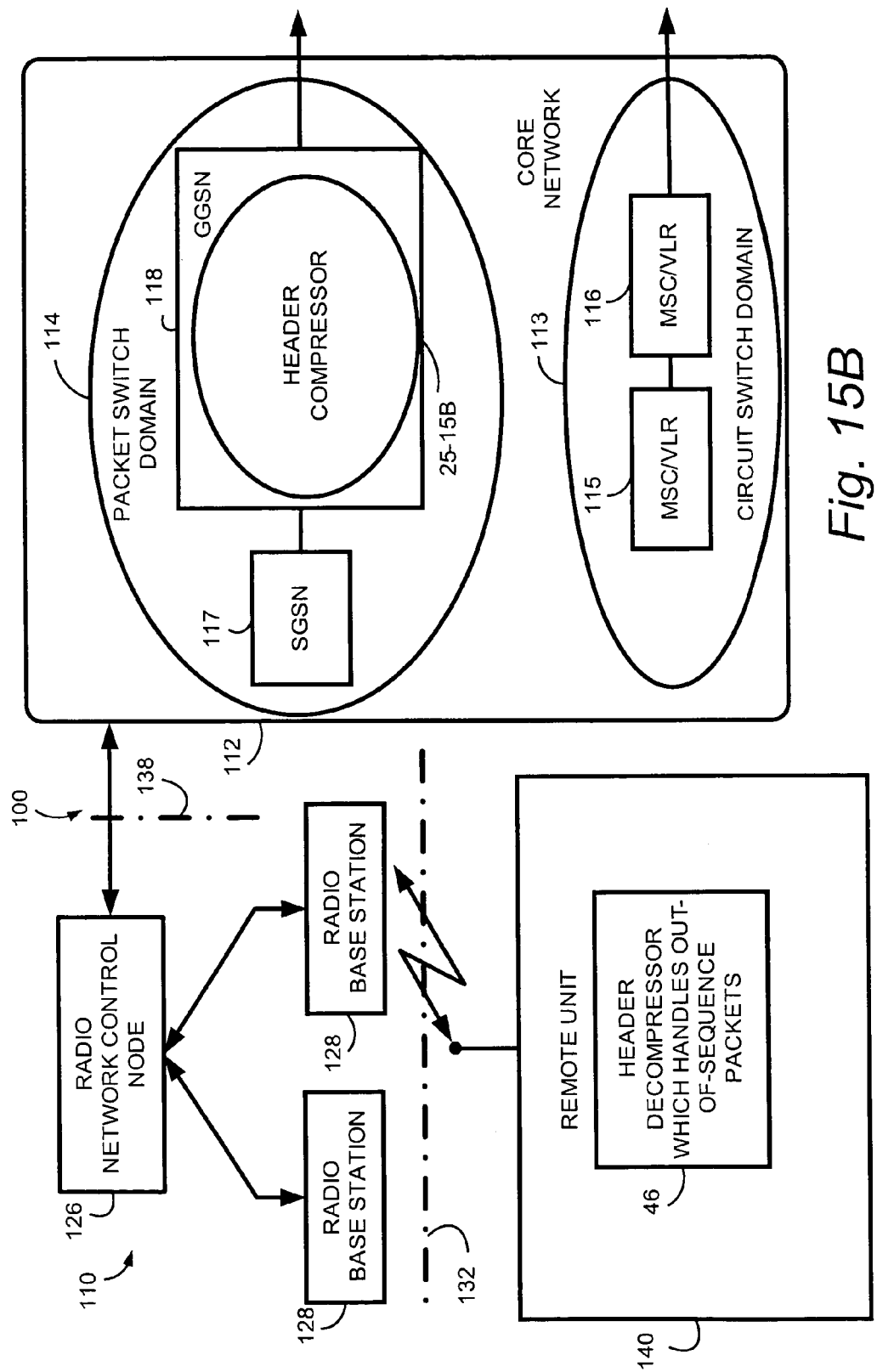
FIG. 15B is a schematic view of a particular telecommunications system which serves as an example context in which the present invention may be employed, and wherein a header compressor is included in a Gateway General Packet Radio Service (GPRS) support node (GGSN).

In the FIG. 15B embodiment, the Gateway General Packet Radio Service (GPRS) support node (GGSN) 118 is shown as hosting the header compressor 25-15B, instead of the hosting being at the SGSN 117. The structure and operation of header compressor 25-15B is essentially similar to that described previously.

Figure 15C:
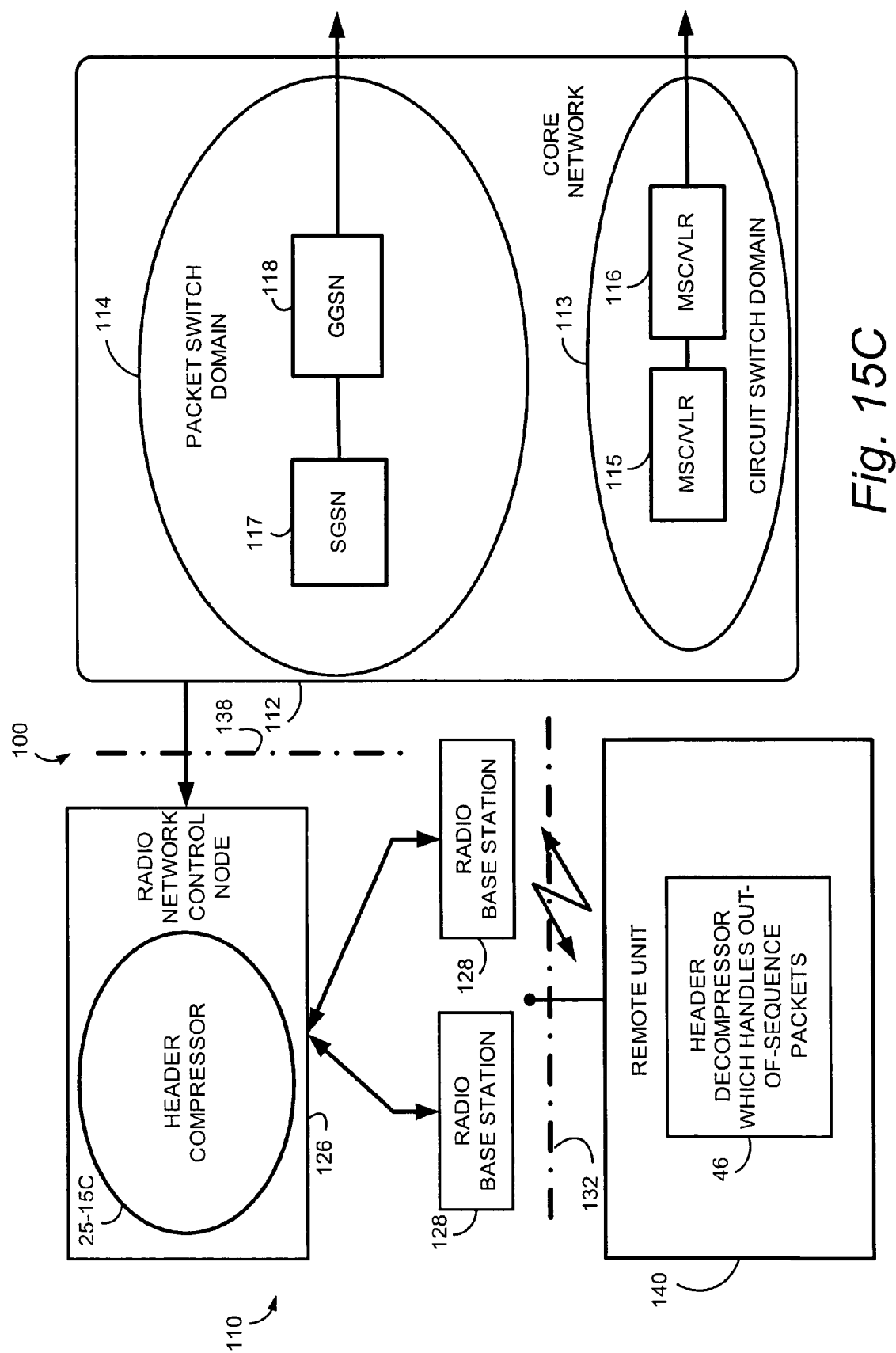
FIG. 15C is a schematic view of a particular telecommunications system which serves as an example context in which the present invention may be employed, wherein a compressor is included in radio network controller (RNC)

In the FIG. 15C embodiment, radio network controller node 126 is shown as hosting the header compressor 25-15C, instead of one of the core network nodes. The structure and operation of header compressor 25-15C is essentially similar to that of the generic, representative header compressor 25 described previously While nodes such as those illustrated in FIG. 15A, FIG. 15B, and FIG. 14C have myriad other elements and functionalities, as understood by the person skilled in the art, illustrated herein are only those elements and functionalities necessary or helpful for illustrating the context information transmission techniques described herein.

It should be noted that even if the generic terms "header compression", "header compressor" and "(header) decompressor" are used to show that the applicability of this idea is not limited to any specific header compression scheme. This is particularly applicable to most ROHC profiles, including—but not limited to—the ROHC-TCP (0x0006), ROHC RTP (0x0001), UDP (0x0002), IP (0x0004), ESP (0x0003), UDP-Lite (0x0008), RTP/UDP-Lite (0x0007) header compression profiles. Some of the proposed solutions also have the advantage of not requiring any change to any of the ROHC standards It should also be understood that the header decompression techniques and other activities described herein need not be performed at nodes or terminals identically structured as those herein illustrated and/or described. Rather, various functions can be distributed or separated to other nodes or devices, or even networks (e.g., core network and radio access network). Moreover, even the header compression functions can be distributed over plural nodes and/or devices, if desired.

In view, e.g., of the foregoing, the term "network node" as employed herein refers to any node or unit, or portion of node or unit, which performs, either in whole or in part, the context information transmission control described herein.

Further, the node or device which hosts the header compressor 25 may or may not be located more than one node or network interface away from a receiving entity. For example, mention herein that context information is sent over an air or radio interface to a receiving entity (e.g., remote unit 40) does not require that the header compressor 25 be situated in a node or location which borders the radio interface.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A header decompressor for use in a remote terminal which receives, over a link, packets including packets having headers which have been compressed and packets which are potentially out-of-order, wherein the header decompressor is configured to perform the following acts:
    (1) detecting non-receipt of packets anticipated in a flow of packets over the link;
    (2) storing in a memory plural snapshots of decompression context information, each of the plural snapshots having been obtained from a different successfully decompressed packet which preceded detection of non-receipt of a packet anticipated in a flow of packets, each snapshot comprising header decompression context information existing in the respective successfully decompressed packet at the respective non-receipt, and configured to update context fields including context fields other than a serial number field or a time stamp field;
    (3) upon header decompression failure for a subsequently received packet, attempting to use the plural snapshots, individually and sequentially, to decompress the header for the subsequently received packet and thereby determine which of the plural snapshots are used to decompress the header for the subsequently received packet in a repair process.

2. The apparatus of claim 1, wherein the header decompressor is configured to further perform the acts of:
    reattempting header decompression of the subsequently received packet using each of the stored snapshots;
    determining that the header decompression for the subsequently received packet succeeded if the header decompression of the subsequently received packet was achieved using one and only one of the stored snapshots.

3. The apparatus of claim 1, wherein using the repair process the header decompressor is configured to reattempt decompression of the subsequently received packet using each of the stored snapshots, wherein the repair process achieves decompression of the subsequently received packet using more than one of the stored snapshots, but wherein the repair process chooses between the more than one of the stored snapshots using an additional verification process.

4. The apparatus of claim 3, wherein the additional verification process is a transport protocol check.

5. The apparatus of claim 1, wherein, for each packet or group of consecutive packets missing in a sequence of the flow, the header decompressor is configured to further perform the act of storing a corresponding snapshot in a set of snapshots in a sliding window memory.

6. The apparatus of claim 1, wherein the header decompressor is further configured to perform the acts of:
    determining if header decompression fails for a predetermined number of packets received after the non-receipt of act (1) and, if so:
    before performing act (3), storing the packets received after the non-receipt which failed the header decompression;
    reattempting header decompression of the stored packets using the updated shapshot of header decompression context information.

7. The apparatus of claim 1, wherein the header decompressor is further configured to perform the act of generating a notification of the non-receipt of packets anticipated in the flow, the notification of the non-receipt including packet resend information to enable resending of a packet with appropriate updating header decompression context information.

8. The apparatus of claim 1, wherein the header decompressor is further configured to perform the acts of:
    determining if header decompression fails for a predetermined number of packets received after the non-receipt of act (1) and, if so:
    before performing act (3):
        storing the packets received after the non-receipt which failed the header decompression; and
        providing a notification that enables a compressor to send, as the subsequently received packet of act (3), a packet with appropriate updating header decompression context information; and
    reattempting header decompression of the stored packets using the updated shapshot of header decompression context information.

9. The apparatus of claim 1, wherein, before performing act (1), the header decompressor is further configured to perform the act of temporarily allocating reusable memory for the stored snapshots in accordance with a parameter received on the link.

10. The apparatus of claim 9, wherein the parameter indicates a size of the reusable memory in which the plural stored snapshots are stored.

11. The apparatus of claim 9, wherein the parameter signals when to allocate the reusable memory for storing the plural stored snapshots.

12. The apparatus of claim 9, wherein the parameter signals when to de-allocate the reusable memory for storing the plural stored snapshots.

13. A method of operating a remote terminal which receives, over a link, packets including packets having headers which have been compressed and packets which are potentially out-of-order, the method comprising:
    (1) detecting possible context damage attributable to missing or out-of-order packets in a flow of packets over the link; and thereafter:
    (2) storing packets which initially fail header decompression; and then,
    (3) successfully using certain context information to perform header decompression of a packet received after detection of the context damage; and
    (4) reattempting header decompression of the stored packets using the certain context information;
    wherein the certain context information comprises a semi-static field of state information obtained from a successfully header decompressed packet and which is necessary for header decompression of a packet that initially fails header decompression, the certain context information being configured to update context fields including context fields other than a serial number field or a time stamp field.

14. A header decompressor for use in a remote terminal which receives, over a link, packets including packets having headers which have been compressed and packets which are potentially out-of-order, the header decompressor being configured to perform the acts of:
(1) detecting possible context damage attributable to missing or out-of-order packets in a flow of packets over the link; and thereafter:
(2) storing packets which initially fail header decompression; and then,
(3) successfully using certain context information to perform header decompression of a packet received after detection of the context damage; and
(4) reattempting header decompression of the stored packets using the certain context information; and
wherein the certain context information comprises a semi-static field of state information obtained from a successfully header decompressed packet and which is necessary for header decompression of a packet that initially fails header decompression, the certain context information being configured to update context fields including context fields other than a serial number field or a time stamp field.

15. A method of operating a telecommunications network comprising:
sending from the network to a remote terminal, over an interface, packets including packets having headers which have been compressed, and packets which are potentially out-of-order;
detecting a situation in which packets sent from the network to the remote terminal have a likelihood of being out-of-order; and in response thereto performing a repair process comprising:
temporarily allocating memory locations for storing a set of context information existing at times at which packet loss at least appears to occur by packets possibly being out-of-order, and de-allocating the memory locations so that the memory location are utilized for other usages when the repair process is not invoked, the context information having been obtained from successfully decompressed packets;
using the set of context information to reattempt header decompression of subsequently received packets that previously failed header decompression possibly by being out-of-order; and
wherein the context information used to reattempt the header decompression is configured to update context fields including context fields other than a serial number field or a time stamp field.

16. The method of claim 15, wherein the situation in which packets sent from the network to the remote terminal have the likelihood of being out-of-order is handover.

17. The method of claim 15, wherein the situation in which packets sent from the network to the remote terminal have the likelihood of being out-of-order is a high packet loss situation.

18. The method of claim 15, further comprising sending a message from the network to the remote terminal, the message including a parameter which triggers a starting of the allocating of the memory locations.

19. The method of claim 15, further comprising sending a message from the network to the remote terminal, the message including a parameter which specifies a size of the memory locations.

20. The method of claim 15, further comprising sending a message from the network to the remote terminal, the message including a parameter which triggers a deallocation of the memory locations.

21. A remote terminal comprising:
a receiver configured to receive, over an air interface, packets including packets having headers which have been compressed and packets which are potentially out-of-order;
a memory configured to store plural snapshots of header decompression context information, each of the plural snapshots having been obtained from a different successfully decompressed packet which preceded detection of non-receipt of a packet anticipated in a flow of packets, each snapshot comprising header decompression context information existing in the respective successfully decompressed packet at the respective non-receipt, each snapshot comprising header decompression context information existing in the respective successfully decompressed packet at the respective non-receipt and configured to update context fields including context fields other than a serial number field or a time stamp field;
a header decompressor configured, upon detection of header decompression failure for a subsequently received packet, to attempt to use the plural snapshots, individually and sequentially, to decompress the header for the subsequently received packet and thereby determine which of the plural snapshots are used to decompress the header for the subsequently received packet in a repair process.

22. The remote terminal of claim 21, wherein using the repair process the header decompressor reattempts decompression of the subsequently received packet using each of the plural stored snapshots, and wherein the repair process determines that the header decompression for the subsequently received packet succeeds if the header decompression of the subsequently received packet was achieved using one and only one of the plural stored snapshots.

23. The remote terminal of claim 21, wherein using the repair process the header decompressor reattempts decompression of the subsequently received packet using each of the plural stored snapshots, wherein the repair process achieves decompression of the subsequently received packet using more than one of the plural stored snapshots, but wherein the repair process chooses between the more than one of the plural stored snapshots using an additional verification process.

24. The remote terminal of claim 23, wherein the additional verification process is a transport protocol check.

25. The remote terminal of claim 21, wherein, for each packet or group of consecutive packets missing in a sequence of the flow, the header decompressor stores a corresponding snapshot in a set of plural snapshots in a sliding window memory.

26. The remote terminal of claim 21, wherein when the header decompressor also determines that header decompression fails for a predetermined number of packets received after the non-receipt of the packets anticipated in the flow, the header decompressor executes an auxiliary repair process which stores the packets received after the non-receipt and which failed the header decompression.

27. The remote terminal of claim 26, wherein if execution of the repair process achieves decompression of the subsequently received packet using one of the plural stored snapshots, the snapshot of the header decompression context information which achieved header decompression is updated and used by the auxiliary repair process for reattempting header decompression of the stored packets.

28. The remote terminal of claim 21, wherein upon failure of the repair process the header decompressor generates a notification of the non-receipt of packets anticipated in the flow, the notification of the non-receipt including packet resend information to enable resending of a packet with appropriate updating header decompression context information.

29. The remote terminal of claim 21, wherein the header decompressor executes a window allocation process which temporarily allocates reusable memory for the plural stored snapshots in accordance with a parameter received on the link.

30. The remote terminal of claim 29, wherein the parameter indicates a size of the reusable memory in which the plural stored snapshots are stored.

31. The remote terminal of claim 29, wherein the parameter signals when to allocate the reusable memory for storing the plural stored snapshots.

32. The remote terminal of claim 29, wherein the parameter signals when to de-allocate the reusable memory for storing the plural stored snapshots.

33. The remote terminal of claim 21, wherein the header decompressor is configured to perform a selective storing in the memory of the snapshots of the header decompression context information obtained from successfully decompressed packets, the selective storing occurring upon detection of the non-receipt of packets anticipated in the flow of the packets over the air interface.

34. A method of operating a remote terminal which receives, over a link, packets including packets having headers which have been compressed and packets which are potentially out-of-order, the method comprising:
 (1) detecting non-receipt of packets anticipated in a flow of packets over the link;
 (2) storing in a memory plural snapshots of decompression context information, each of the plural snapshots having been obtained from a different successfully decompressed packet which preceded detection of non-receipt of a packet anticipated in a flow of packets, each snapshot comprising header decompression context information existing in the respective successfully decompressed packet at the respective non-receipt and configured to update context fields including context fields other than a serial number field or a time stamp field;
 (3) upon header decompression failure for a subsequently received packet, attempting to use the plural snapshots, individually and sequentially, to decompress the header for the subsequently received packet and thereby determine which of the plural snapshots are used to decompress the header for the subsequently received packet in a repair process.

35. The method of claim 34, further comprising:
reattempting header decompression of the subsequently received packet using each of the plural stored snapshots;
determining that the header decompression for the subsequently received packet succeeded if the header decompression of the subsequently received packet was achieved using one and only one of the plural stored snapshots.

36. The method of claim 34, further comprising reattempting decompression of the subsequently received packet using each of the plural stored snapshots;
upon achieving decompression of the subsequently received packet using more than one of the plural stored snapshots, choosing between the more than one of the plural stored snapshots using an additional verification process.

37. The method of claim 36, wherein the additional verification process is a transport protocol check.

38. The method of claim 34, further comprising detecting the header decompression failure for the subsequently received packet by inability to verify the header decompression using cyclic redundancy check (CRC) or transport layer checksum for the subsequently received packet.

39. The method of claim 34, further comprising, for each packet or group of consecutive packets missing in a sequence of the flow, storing a corresponding snapshot in a set of snapshots in a sliding window memory.

40. The method of claim 39, further comprising determining a subset of the snapshots in the sliding memory to use for the plural stored snapshots of step (3).

41. The method of claim 39, further comprising allocating a maximum size of the sliding window memory based on a product of bandwidth and delay of the link.

42. The method of claim 41, further comprising updating contents of the sliding window memory by ensuring that an oldest snapshot in the sliding window memory corresponds to a maximum reordering depth the sliding window memory can handle.

43. The method of claim 34, further comprising:
determining if header decompression fails for a predetermined number of packets received after the non-receipt of step (1) and, if so:
before performing step (3), storing the packets received after the non-receipt which failed the header decompression;
updating the snapshot of header decompression context information which in step (3) achieved header decompression of the subsequently received packet; and
reattempting header decompression of the stored packets using the updated snapshot of header decompression context information.

44. The method of claim 43, further comprising:
generating a notification of the non-receipt of packets anticipated in the flow, the notification of the non-receipt including packet resend information to enable resending of a packet with appropriate updating header decompression context information.

45. The method of claim 44, wherein the notification of the non-receipt includes a sequence number of a last successfully decompressed packet as the packet resend information.

46. The method of claim 34, further comprising:
determining if header decompression fails for a predetermined number of packets received after the non-receipt of step (1) and, if so:
before performing step (3):
 storing the packets received after the non-receipt which failed the header decompression; and
 providing a notification that enables a compressor to send, as the subsequently received packet of step (3), a packet with appropriate updating header decompression context information; and
reattempting header decompression of the stored packets using the updated shapshot of header decompression context information.

47. The method of claim 34, further comprising before performing step (1), temporarily allocating reusable memory for the stored snapshots in accordance with a parameter received on the link.

48. The method of claim 47, wherein the parameter indicates a size of the reusable memory in which the plural stored snapshots are stored.

49. The method of claim 47, wherein the parameter signals when to allocate the reusable memory for storing the plural stored snapshots.

50. The method of claim 47, wherein the parameter signals when to de-allocate the reusable memory for storing the plural stored snapshots.

51. The method of claim 34, wherein the link is over an air interface.

52. The method of claim 34, wherein the headers have been compressed using Robust Header Compression (ROHC) in U/O-mode.

53. The method of claim 34, wherein the headers have been compressed using SigComp.

54. The method of claim 34, further comprising selectively storing the snapshots upon the detecting of each non-receipt.

* * * * *

UNITED STATES PATENT AND TRADEMARK OFFICE
CERTIFICATE OF CORRECTION

PATENT NO. : 7,924,731 B2
APPLICATION NO. : 10/987218
DATED : April 12, 2011
INVENTOR(S) : Pelletier et al.

It is certified that error appears in the above-identified patent and that said Letters Patent is hereby corrected as shown below:

On Page 2, in Field (56), under "OTHER PUBLICATIONS", in Column 2, Line 15, delete "eta" and insert -- et --, therefor.

In Fig. 11, Sheet 14 of 24, delete " 70 3)( " and insert -- 70(3) --, therefor.

In Fig. 11B, Sheet 16 of 24, delete " 34 " and insert -- 34 --, therefor.

In Column 17, Line 6, delete "Prepair(xo)" and insert -- $Pr_{repair}(x_0)$ --, therefor.

In Column 17, Line 11, delete "(xo)" and insert -- $(x_0)$ --, therefor at each occurrence throughout the specification.

In Column 17, Line 12, delete "Prepair(xo)" and insert -- $Pr_{repair}(x_0)$ --, therefor.

In Column 17, Line 45, in Equation 2,
delete "Prrepair(x)'=Σweight(bits(CRC))*Prrepair(x,bits(CRC))" and
insert -- $Pr_{repair}(x)'=\Sigma weight(bits(CRC))*Pr_{repair}(x,bits(CRC))$ --, therefor.

In Column 18, Line 37, delete "Reattemped" and insert -- Reattempted --, therefor.

In Column 21, Line 17, delete "reattemps" and insert -- reattempts --, therefor.

In Column 22, Line 2, delete "indentifier" and insert -- identifier --, therefor.

In Column 26, Line 43, delete "equipement" and insert -- equipment --, therefor.

Signed and Sealed this
Twenty-fourth Day of April, 2012

David J. Kappos
*Director of the United States Patent and Trademark Office*

CERTIFICATE OF CORRECTION (continued)
U.S. Pat. No. 7,924,731 B2

In Column 27, Line 11, delete "GRPS" and insert -- GPRS --, therefor.

In Column 27, Line 25, delete "GRPS" and insert -- GPRS --, therefor.

In Column 28, Lines 58-59, delete "standards" and insert -- standards. --, therefor.

In Column 30, Line 9, in Claim 6, delete "shapshot" and insert -- snapshot --, therefor.

In Column 30, Line 33, in Claim 8, delete "shapshot" and insert -- snapshot --, therefor.

In Column 34, Line 62, in Claim 46, delete "shapshot" and insert -- snapshot --, therefor.